US012570067B2

(12) United States Patent
Dominici et al.

(10) Patent No.: US 12,570,067 B2
(45) Date of Patent: Mar. 10, 2026

(54) METHOD FOR REDUCING AN INITIAL HEIGHT OF A PACKAGE, SUCH AS A SLOTTED CONTAINER, ACCORDING TO ITS CONTENTS, AND DEVICE FOR CARRYING OUT SUCH A METHOD

(71) Applicant: DURRENBERG, Gemenos (FR)

(72) Inventors: Bernard Dominici, Gemenos (FR); Joris Peters, Aubagne (FR)

( * ) Notice: Subject to any disclaimer, the term of this patent is extended or adjusted under 35 U.S.C. 154(b) by 0 days.

(21) Appl. No.: 18/870,720

(22) PCT Filed: May 30, 2023

(86) PCT No.: PCT/IB2023/055501
§ 371 (c)(1),
(2) Date: Dec. 2, 2024

(87) PCT Pub. No.: WO2023/233274
PCT Pub. Date: Dec. 7, 2023

(65) Prior Publication Data

US 2025/0326195 A1 Oct. 23, 2025

(30) Foreign Application Priority Data

Jun. 1, 2022 (FR) ........................................ 2205292

(51) Int. Cl.
*B31B 50/00* (2017.01)
*B31B 50/14* (2017.01)
(Continued)

(52) U.S. Cl.
CPC ............ *B31B 50/006* (2017.08); *B31B 50/14* (2017.08); *B65B 61/02* (2013.01); *B65B 65/02* (2013.01)

(58) Field of Classification Search
CPC ....... B31B 50/006; B31B 50/14; B65B 61/02; B65B 65/02
See application file for complete search history.

(56) References Cited

U.S. PATENT DOCUMENTS 3,015,197 A * 1/1962 Eichorn .................. B65B 5/024 53/208
7,823,367 B2 * 11/2010 Boigues .................... B65B 5/02 53/503

(Continued)

FOREIGN PATENT DOCUMENTS

JP 2013216055 A 10/2013
JP 2020110978 A 7/2020
WO 2016151310 A1 9/2016

OTHER PUBLICATIONS

International Search Report for corresponding PCT/IB2023/055501 dated Oct. 19, 2023.

(Continued)

*Primary Examiner* — Thomas M Wittenschlaeger
(74) *Attorney, Agent, or Firm* — Egbert, McDaniel & Swartz, PLLC

(57) ABSTRACT

A method for reducing an initial height of a package including: a priority phase including a priority step of determining a priority volume of a priority batch of objects of a maximum height and three secondary volumes, a priority step of moving an arm inside the package to a position in which a feeler comes into contact with the objects in order to determine a priority height, a priority step of deforming the flanks along two priority folding lines bordering the priority volume by a marking tool, and a priority step of separating the flanks by a cutting tool, three secondary phases including a secondary step of moving the arm by the priority distance, a secondary step of deforming the flanks bordering the secondary volume along two secondary folding lines by the marking tool and a secondary step of separating the flanks bordering the secondary volume by the cutting tool.

21 Claims, 36 Drawing Sheets

(51) Int. Cl.
*B65B 61/02* (2006.01)
*B65B 65/02* (2006.01)

(56) References Cited

U.S. PATENT DOCUMENTS

| | | | | |
|---|---|---|---|---|
| 7,849,776 | B2 * | 12/2010 | Hilgendorf | B26D 11/00 |
| | | | | 414/412 |
| 10,633,136 | B2 * | 4/2020 | Dominici | B65B 7/20 |
| 10,954,018 | B2 * | 3/2021 | Benterman | B26D 1/245 |
| 11,661,227 | B2 * | 5/2023 | Benterman | B26D 1/305 |
| | | | | 493/309 |
| 12,054,302 | B2 * | 8/2024 | Opitz | B65B 59/001 |
| 12,202,638 | B2 * | 1/2025 | Klarner | B65B 7/20 |
| 2009/0031676 | A1 * | 2/2009 | Boigues | B65B 55/20 |
| | | | | 53/376.4 |
| 2014/0013709 | A1 * | 1/2014 | Ceyssens | B65B 51/00 |
| | | | | 53/285 |
| 2015/0119216 | A1 * | 4/2015 | Benterman | B26D 5/007 |
| | | | | 493/309 |
| 2017/0001746 | A1 * | 1/2017 | Dominici | B65B 61/00 |
| 2023/0124423 | A1 * | 4/2023 | Karol | B65B 57/00 |
| | | | | 53/66 |

OTHER PUBLICATIONS

Written Opinion of the International Searching Authority for corresponding PCT/IB2023/055501 dated Oct. 19, 2023.

* cited by examiner

[Fig 1]
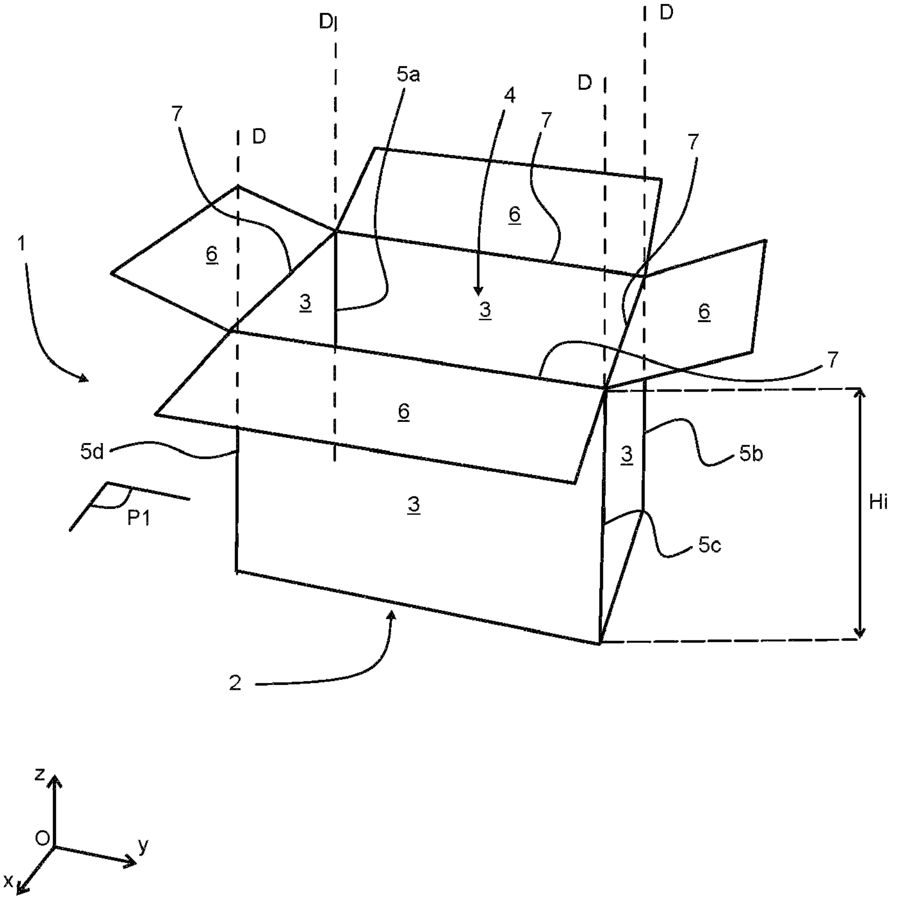

[Fig 2]
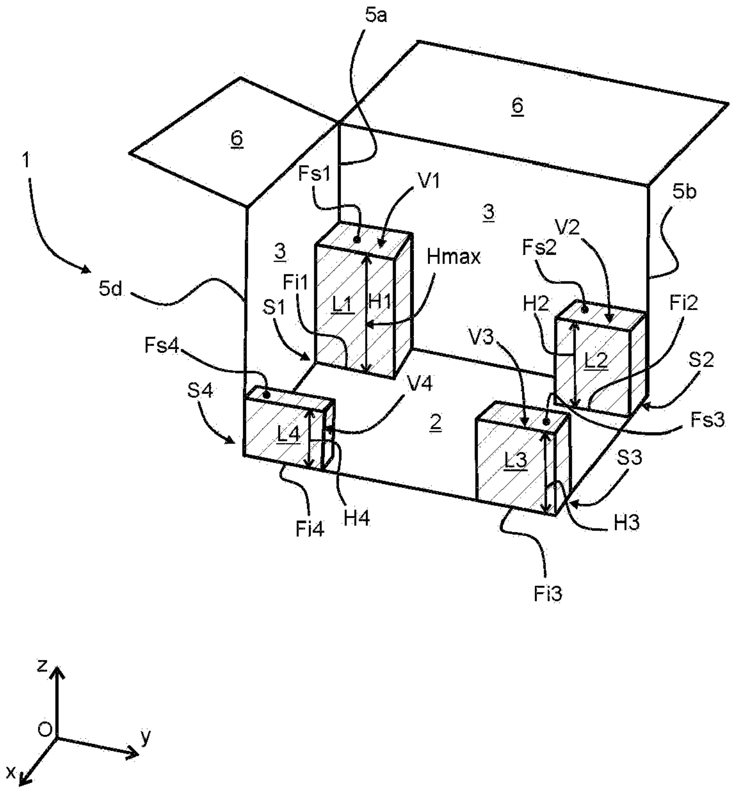

[Fig 3]
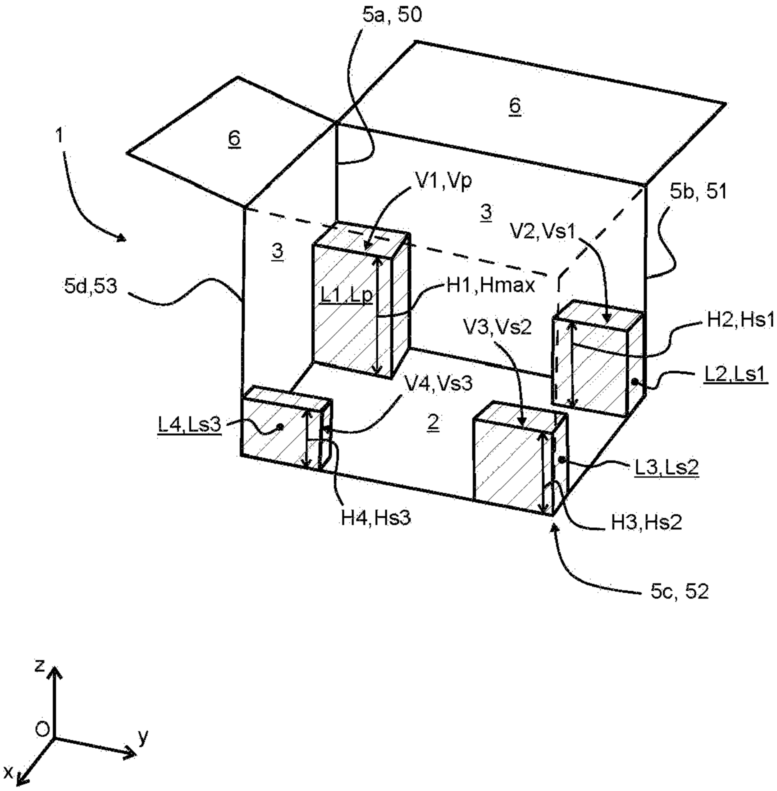

[Fig 4]
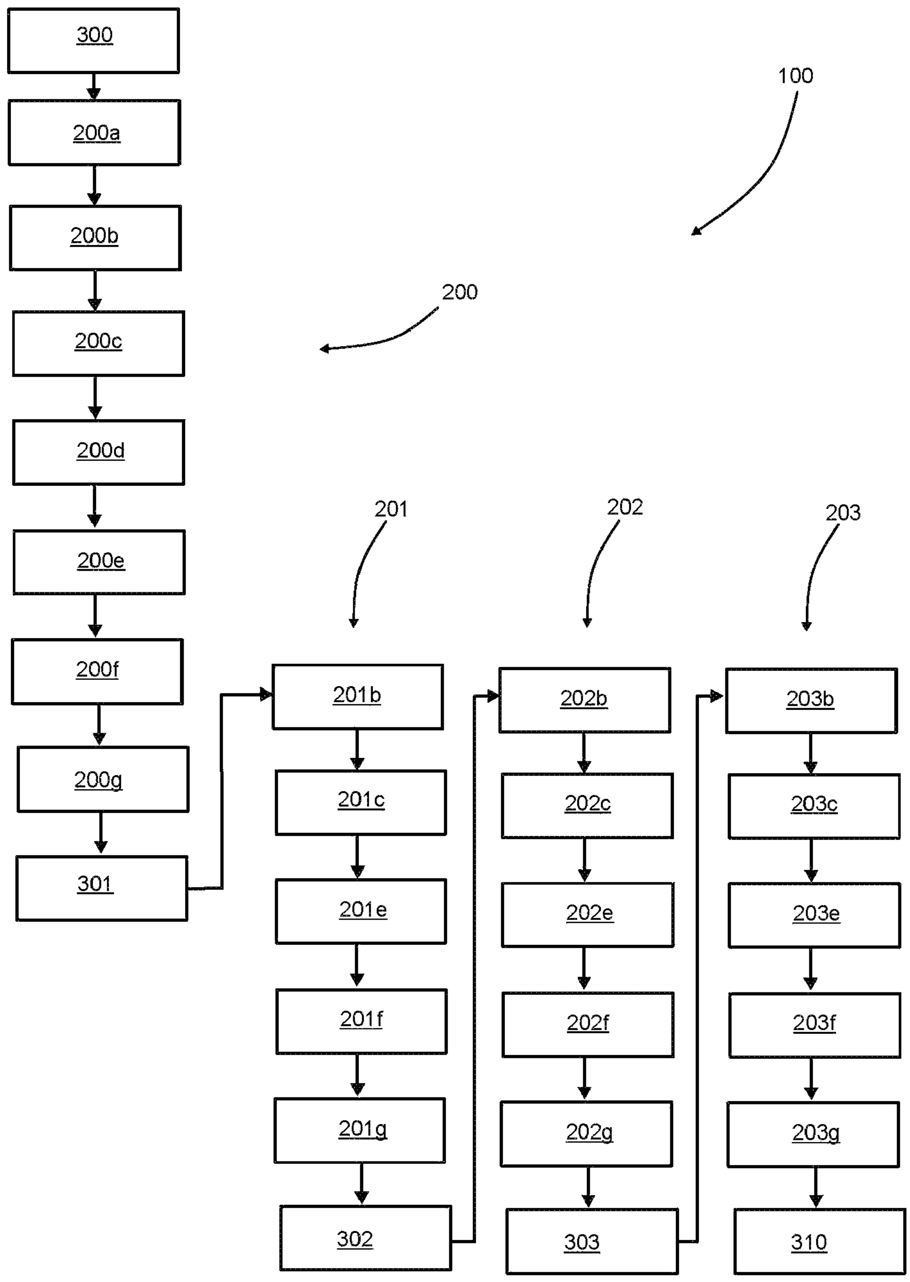

[Fig 5]
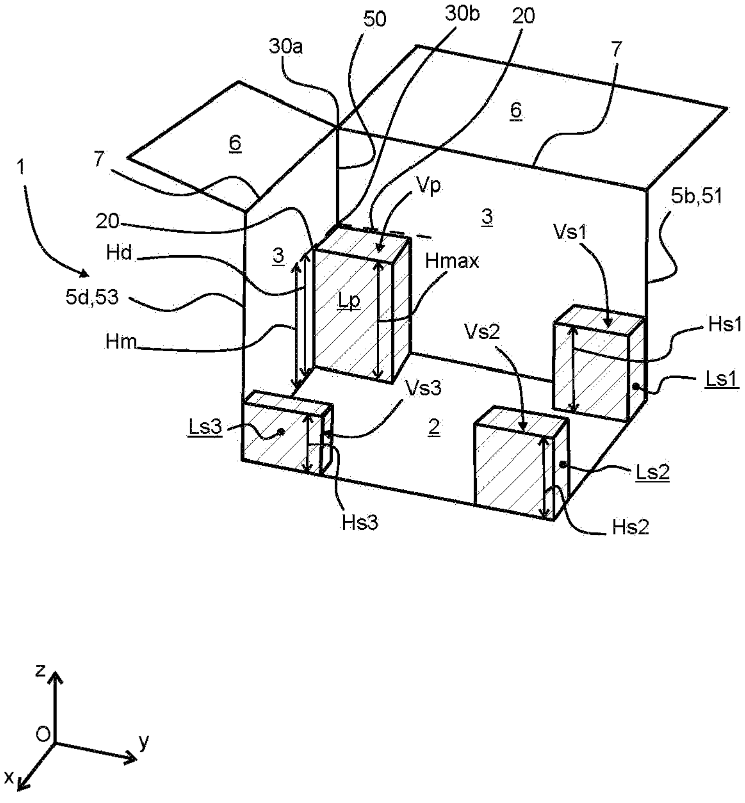

[Fig 6]
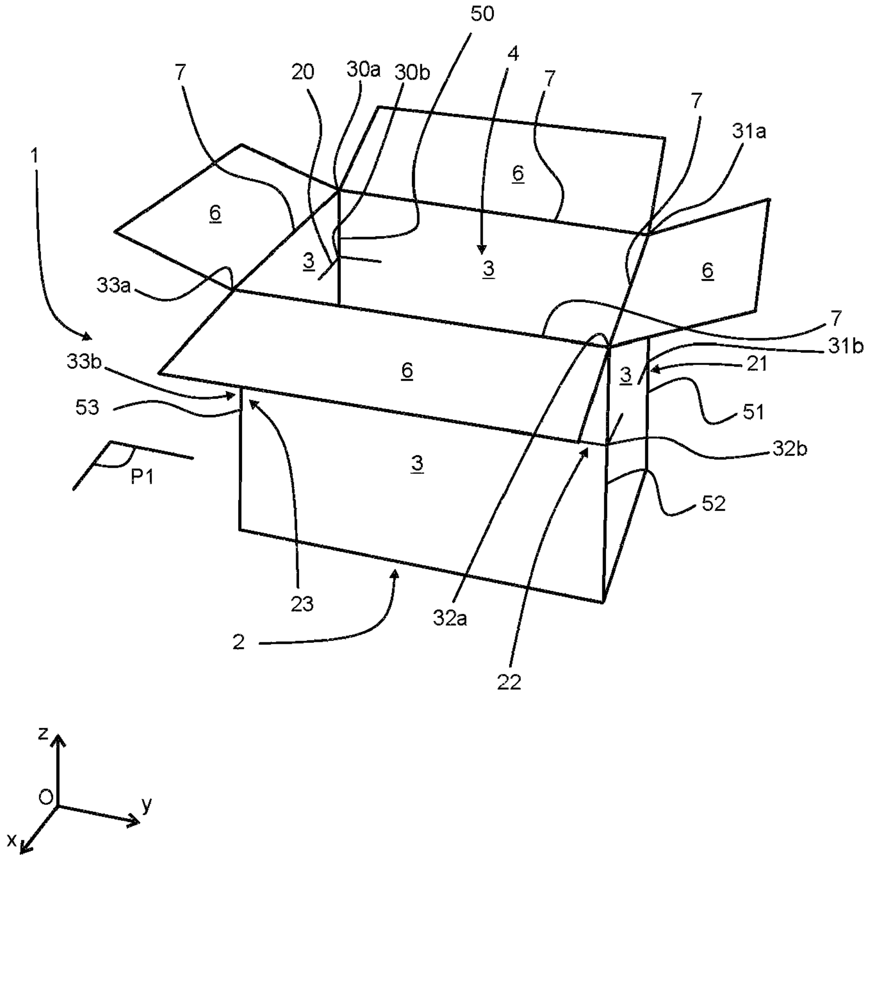

[Fig 7]
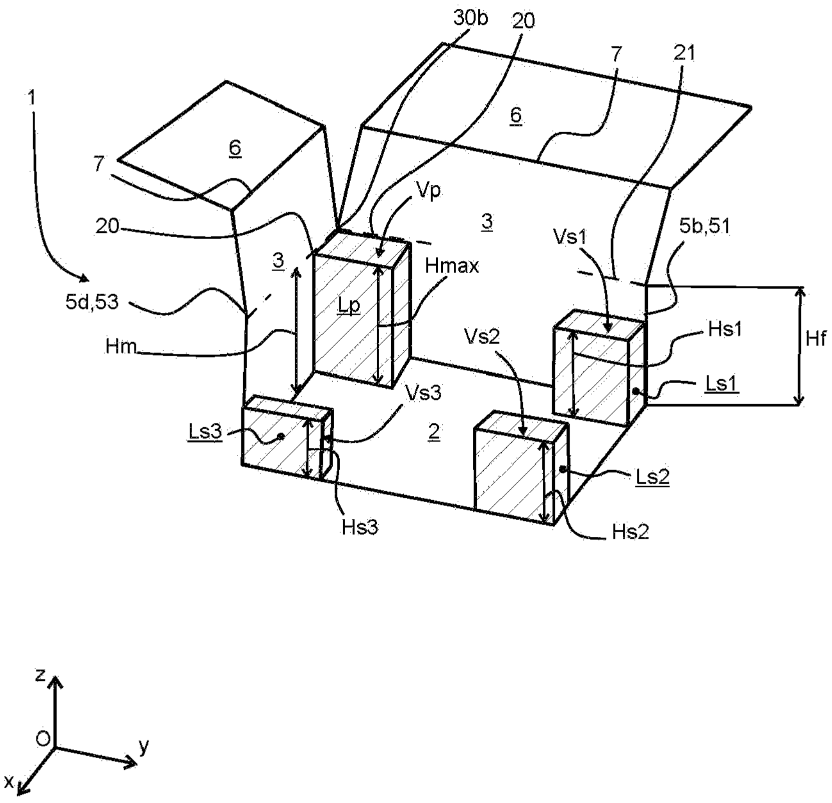

[Fig 8]
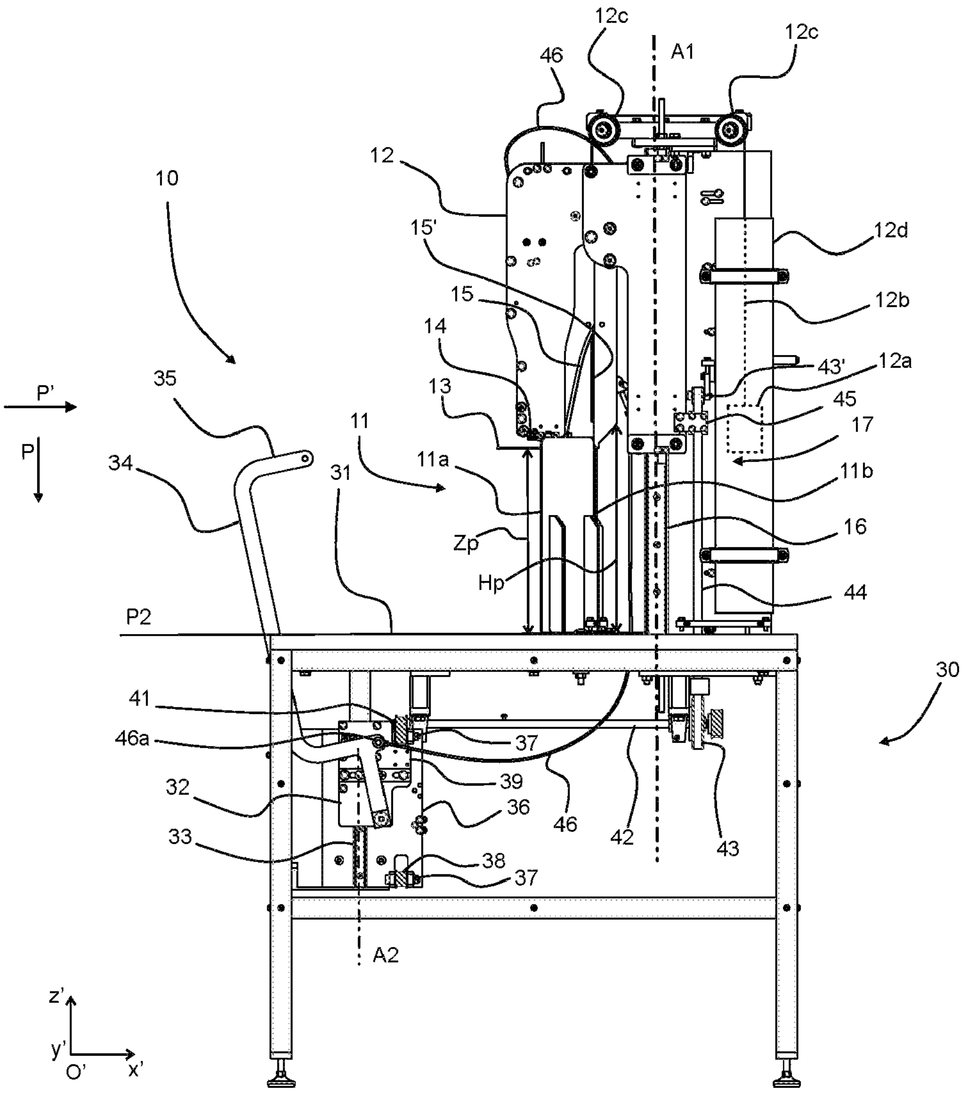

[Fig 9]
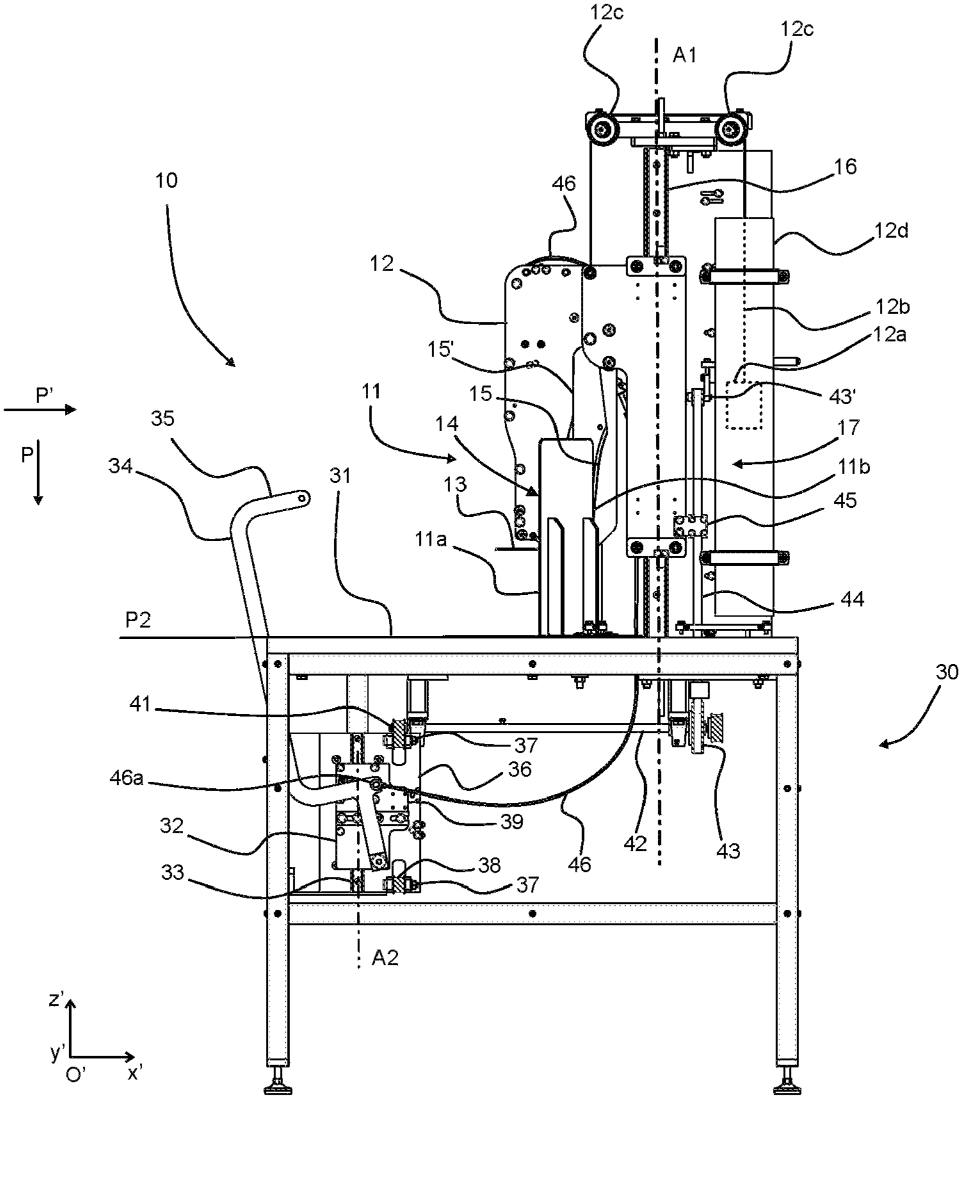

[Fig 10]
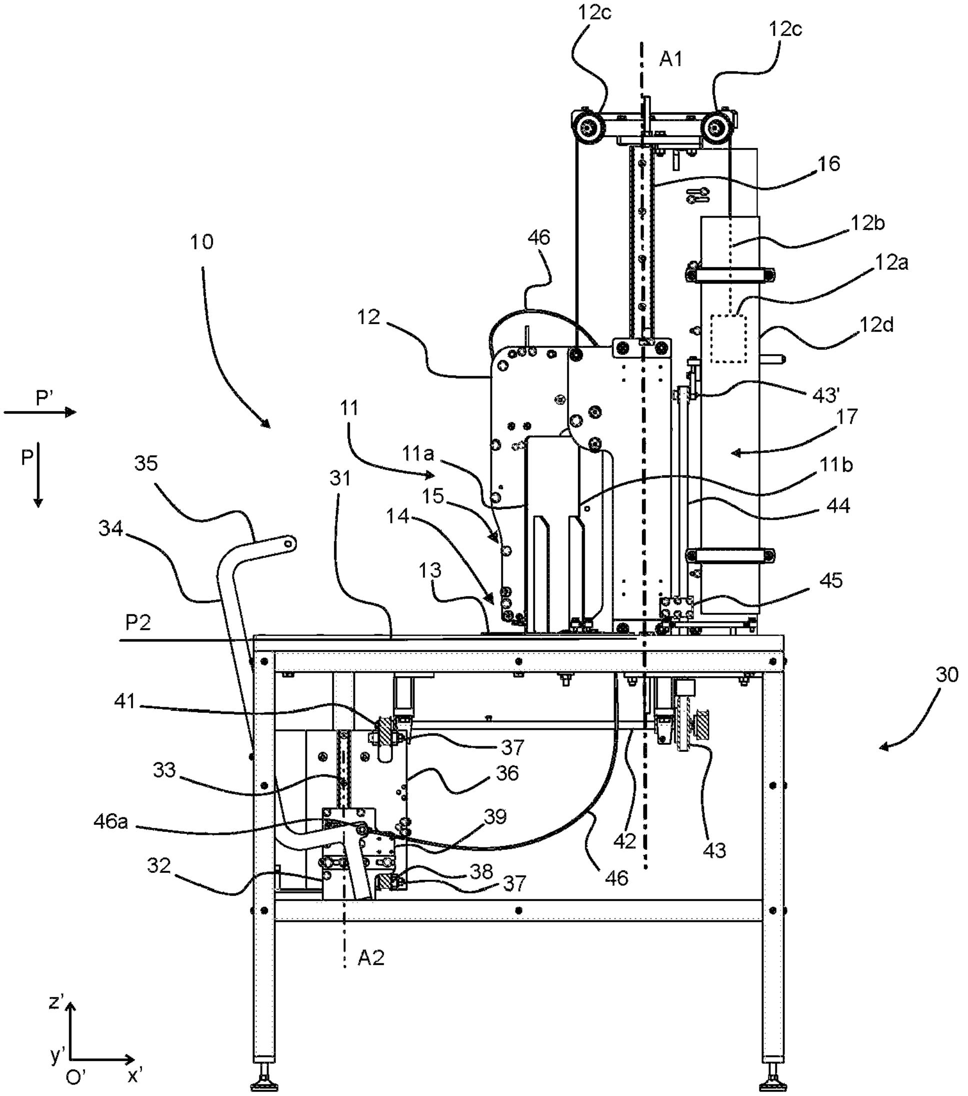

[Fig 11]
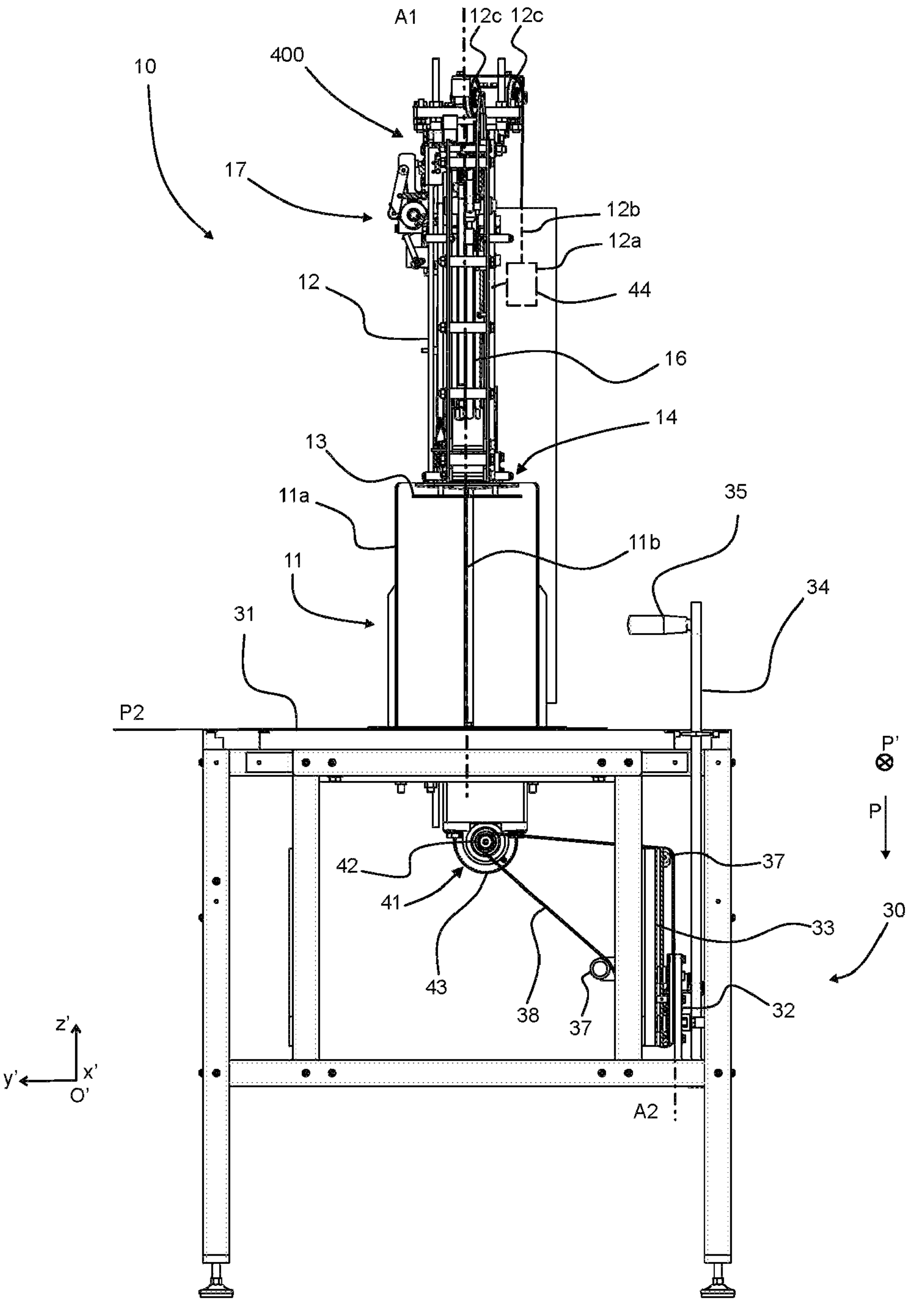

[Fig 12]
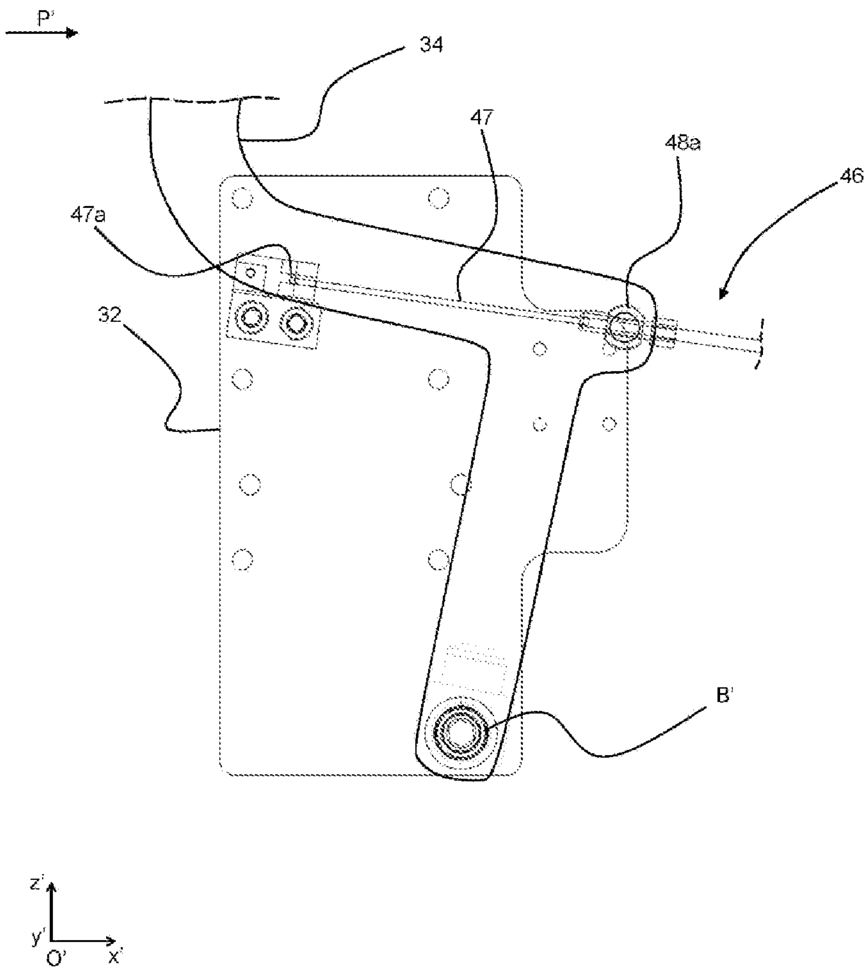

[Fig 13]
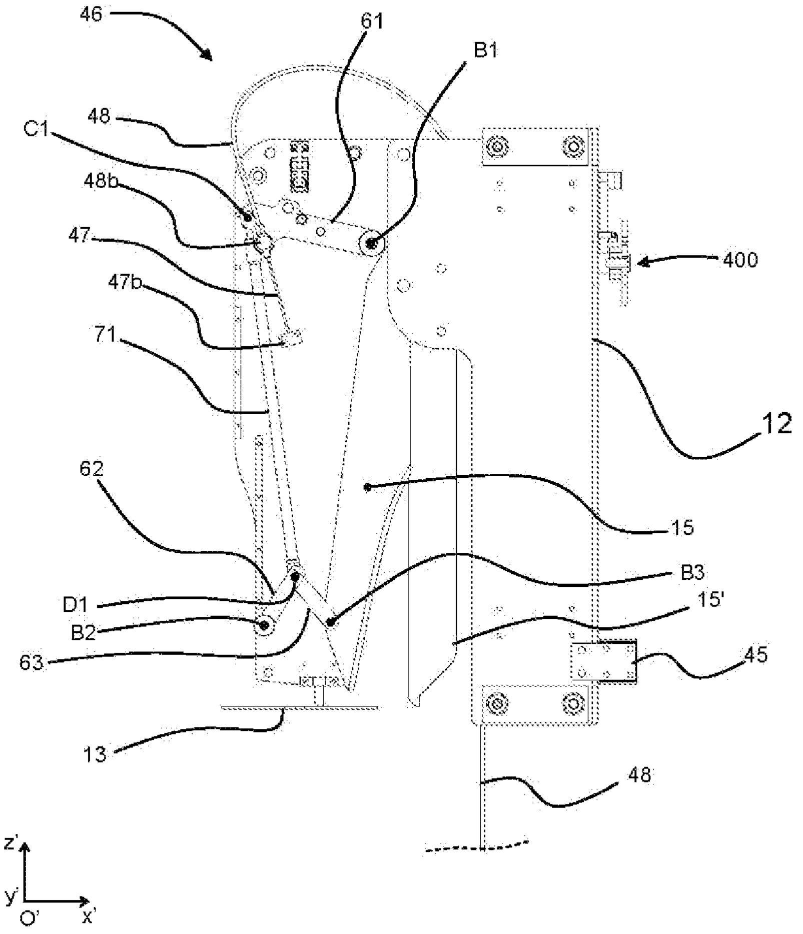

[Fig 14]
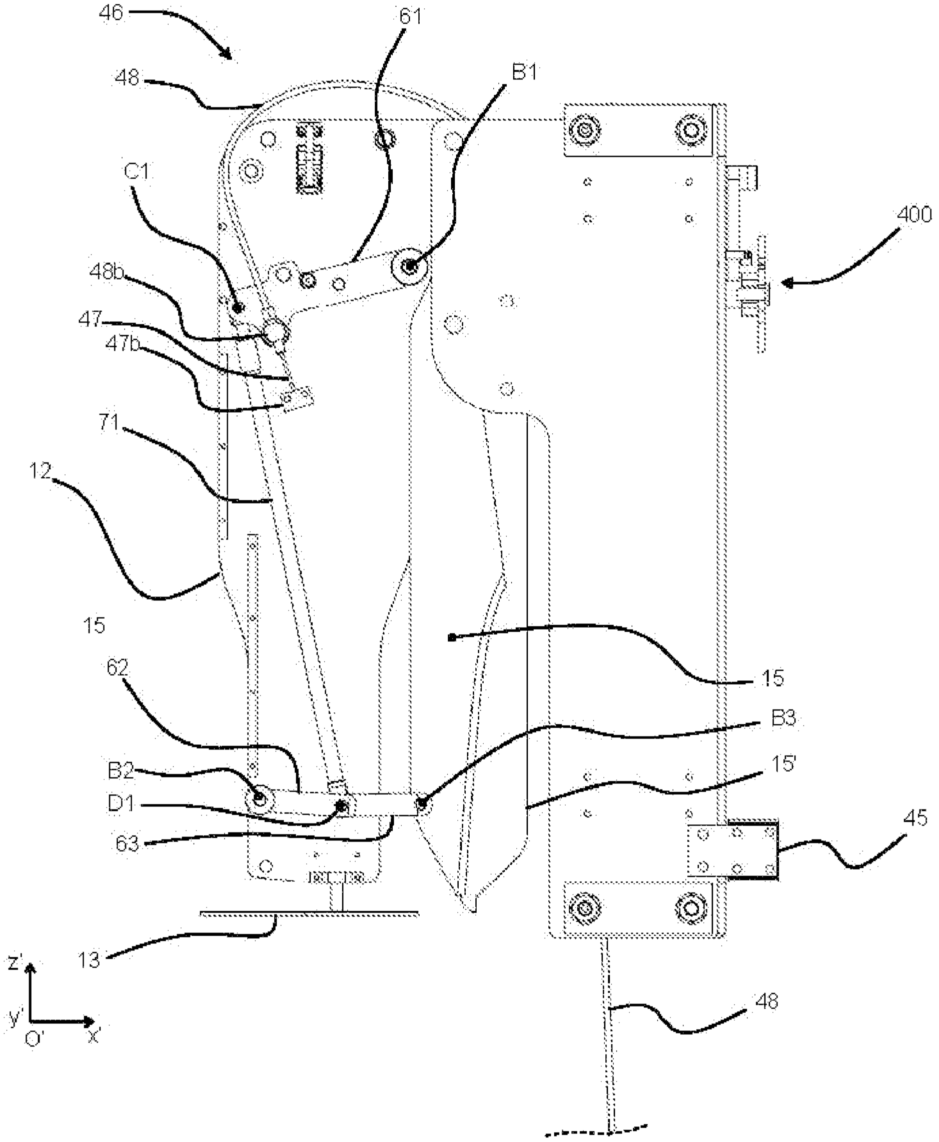

[Fig 15]
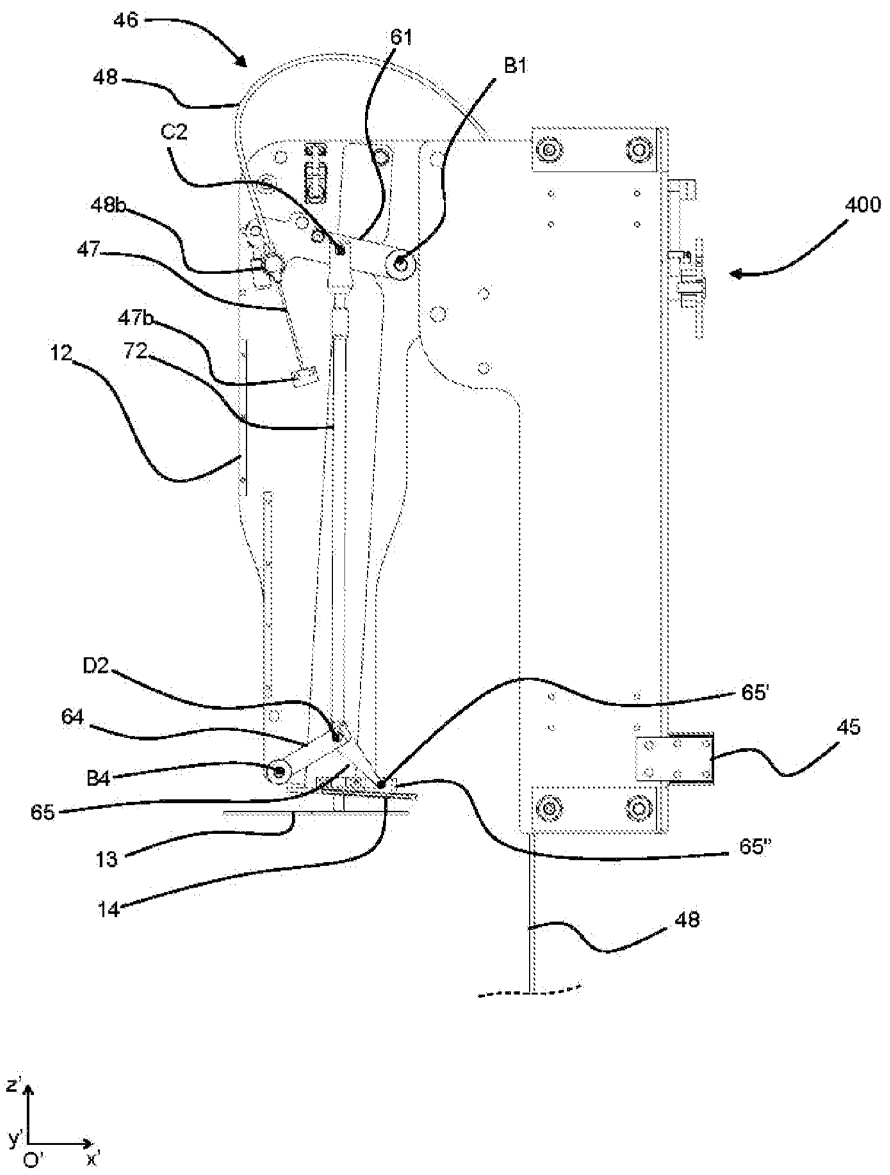

[Fig 16]
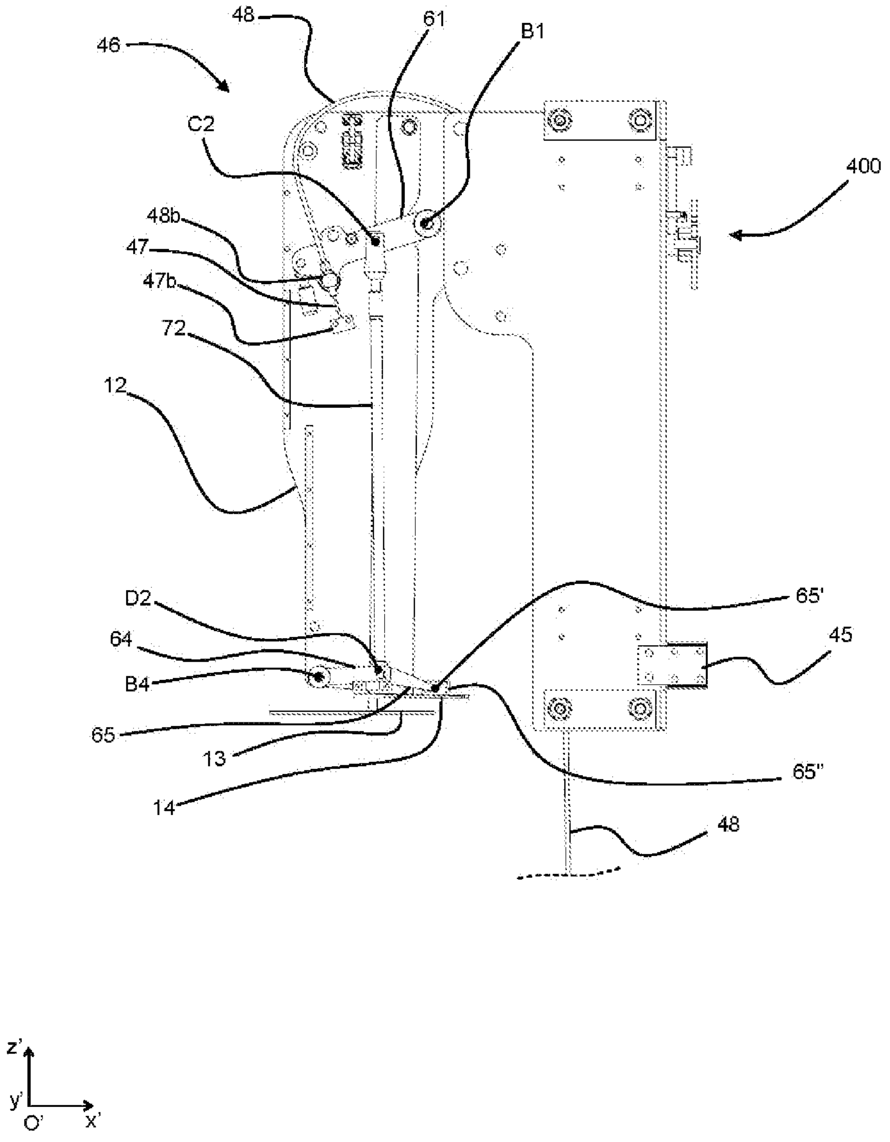

[Fig 17]
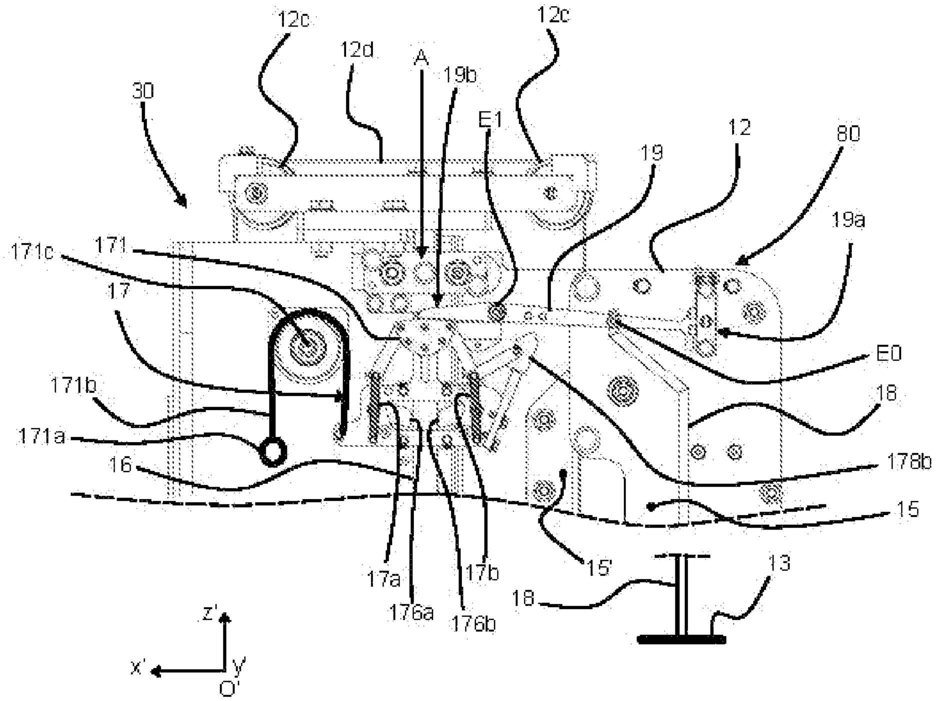

[Fig 18]
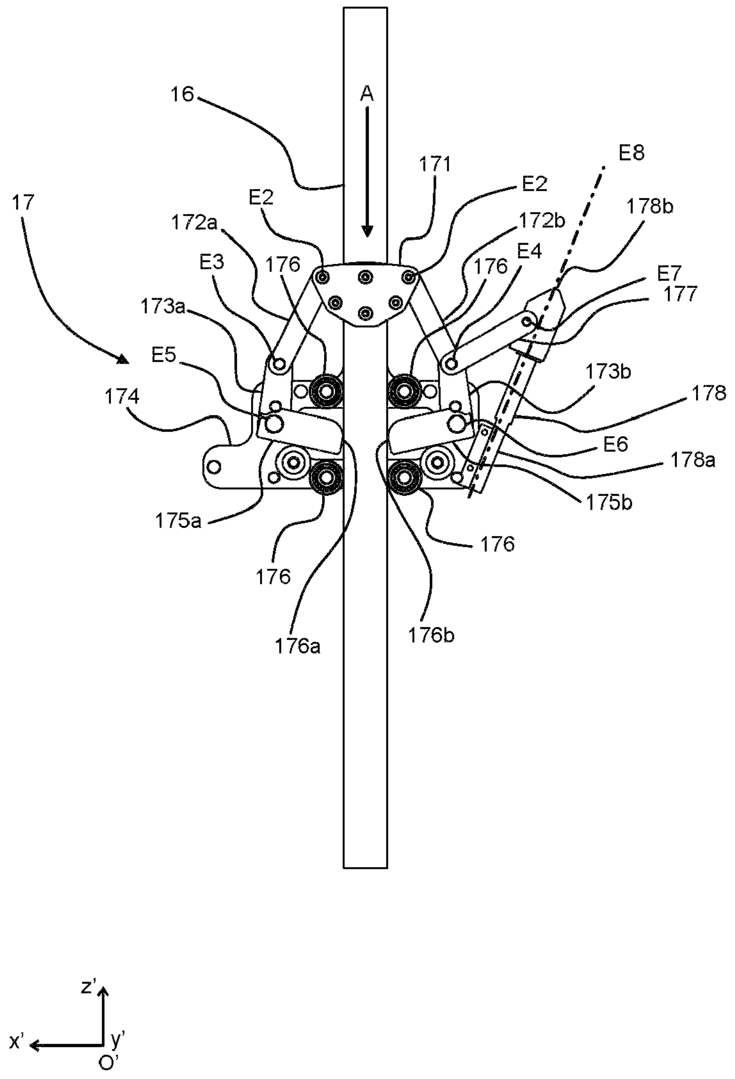

[Fig 19]
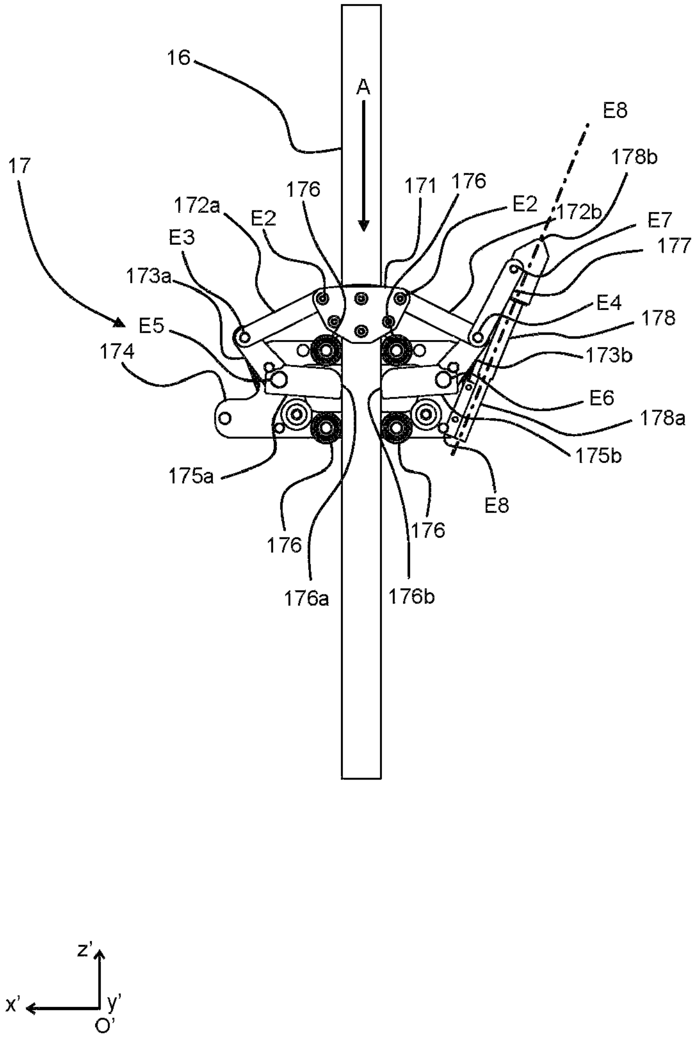

[Fig 20]
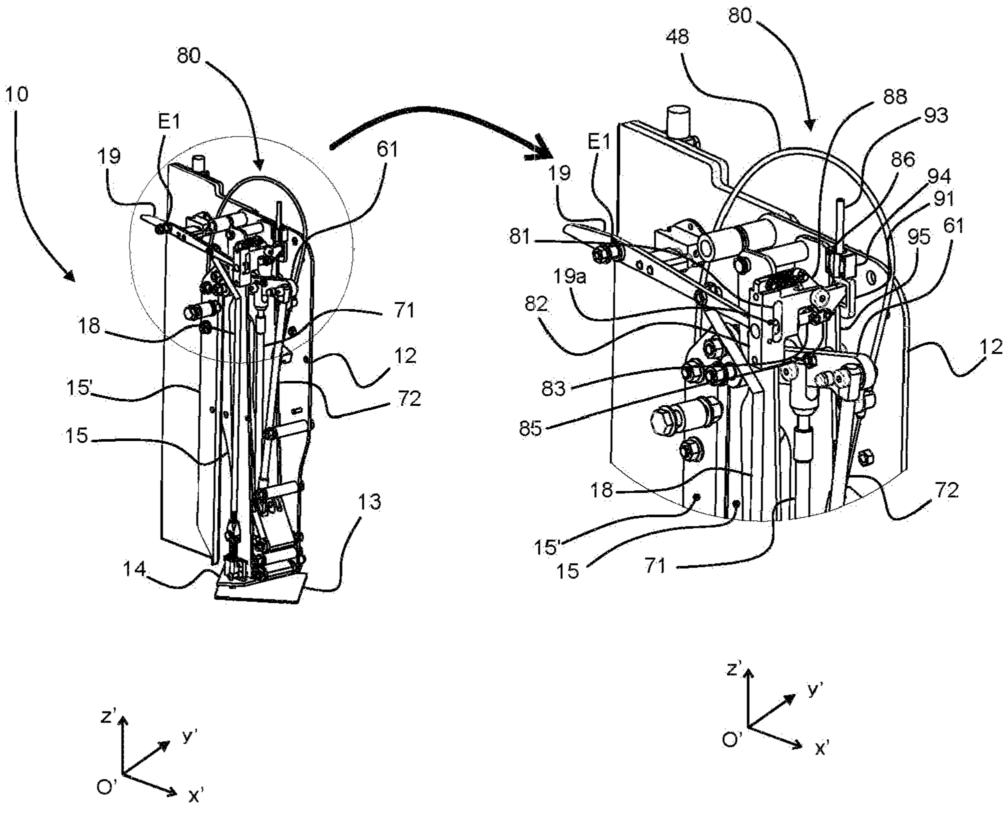

[Fig 21]
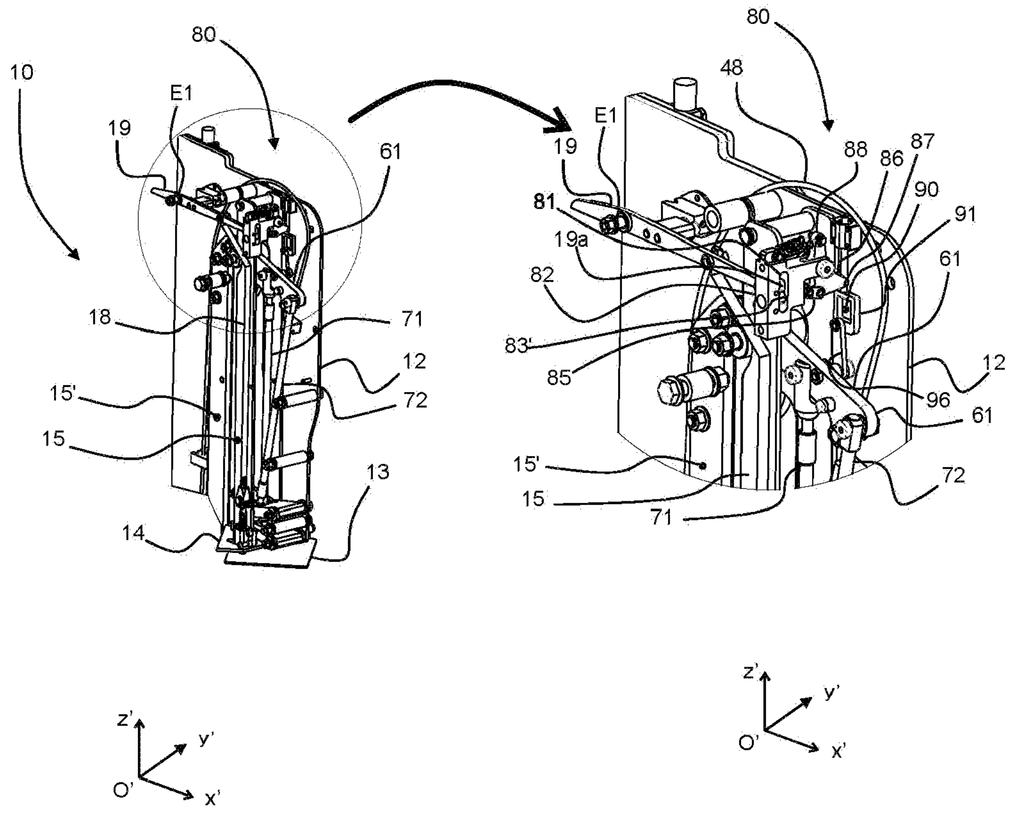

[Fig 22]
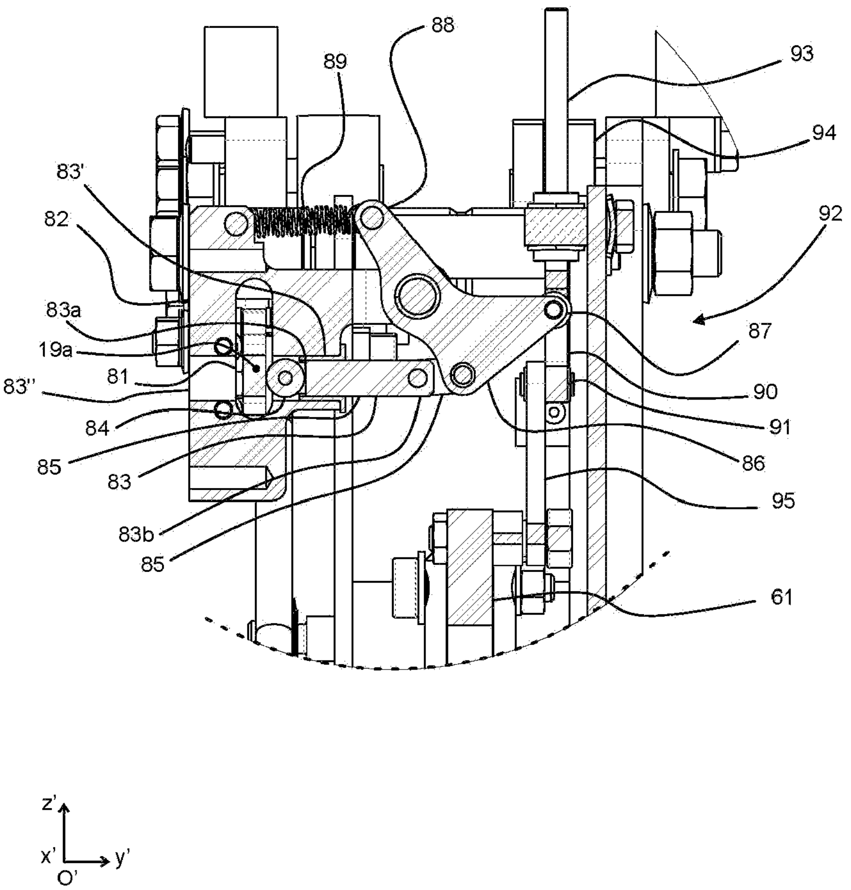

[Fig 23]
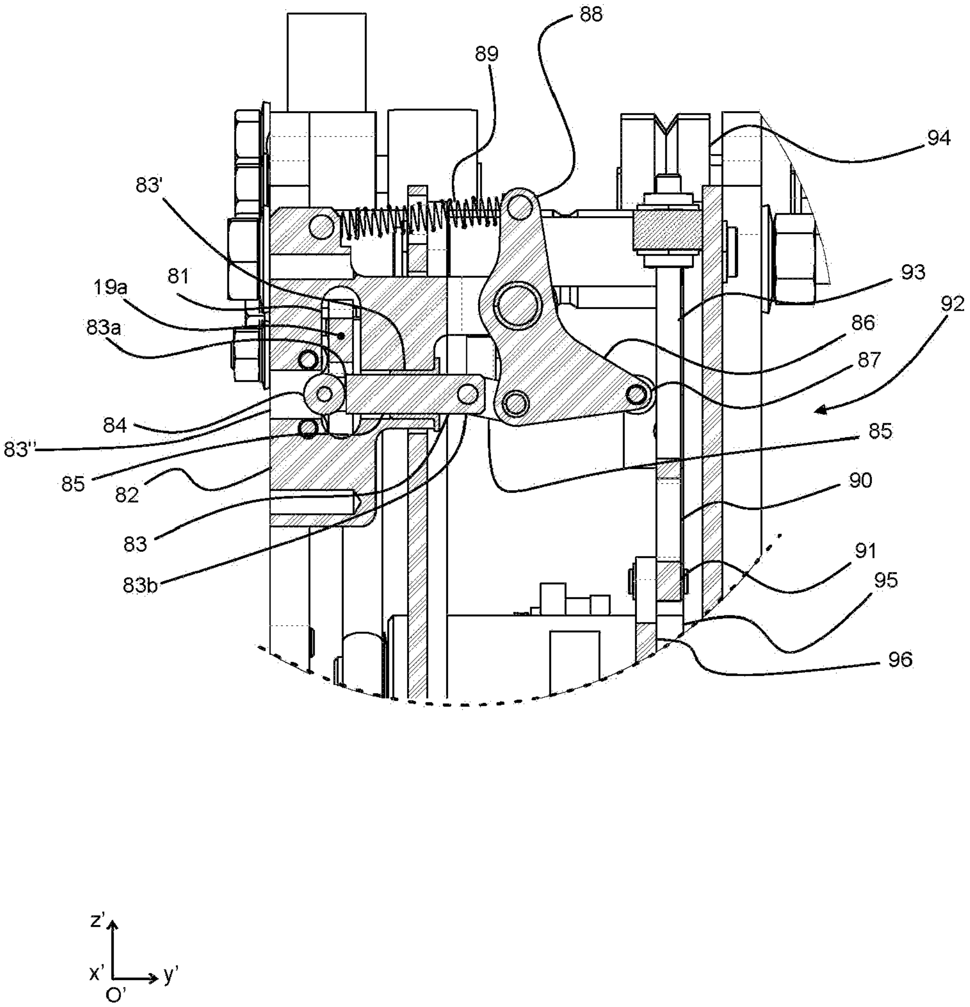

[Fig 24]
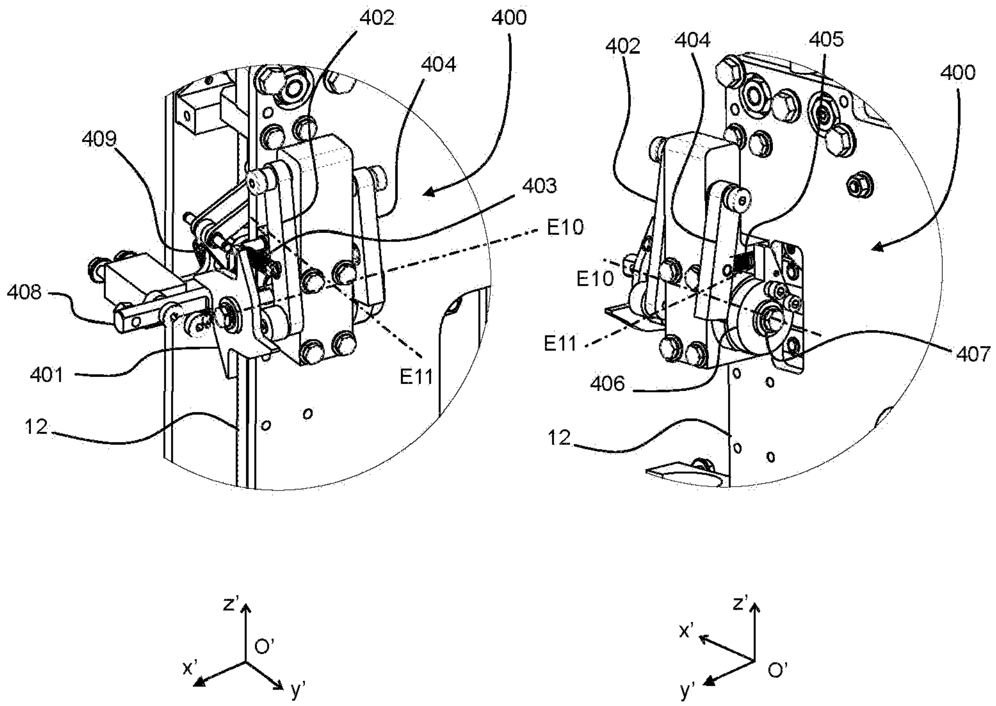

[Fig 25]
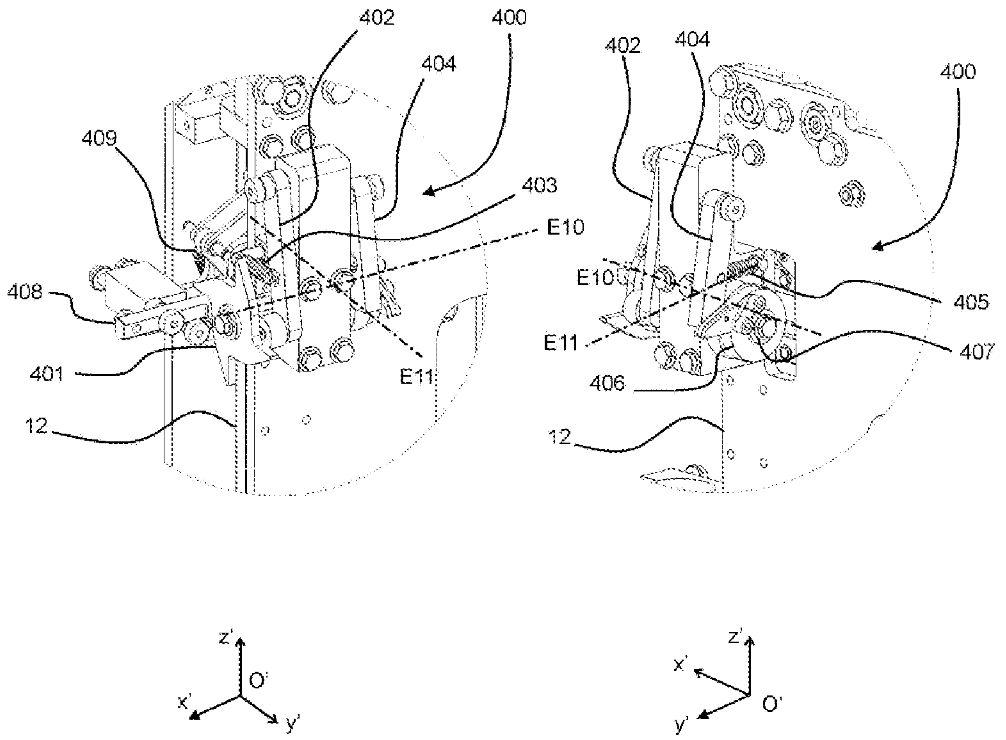

[Fig 26]
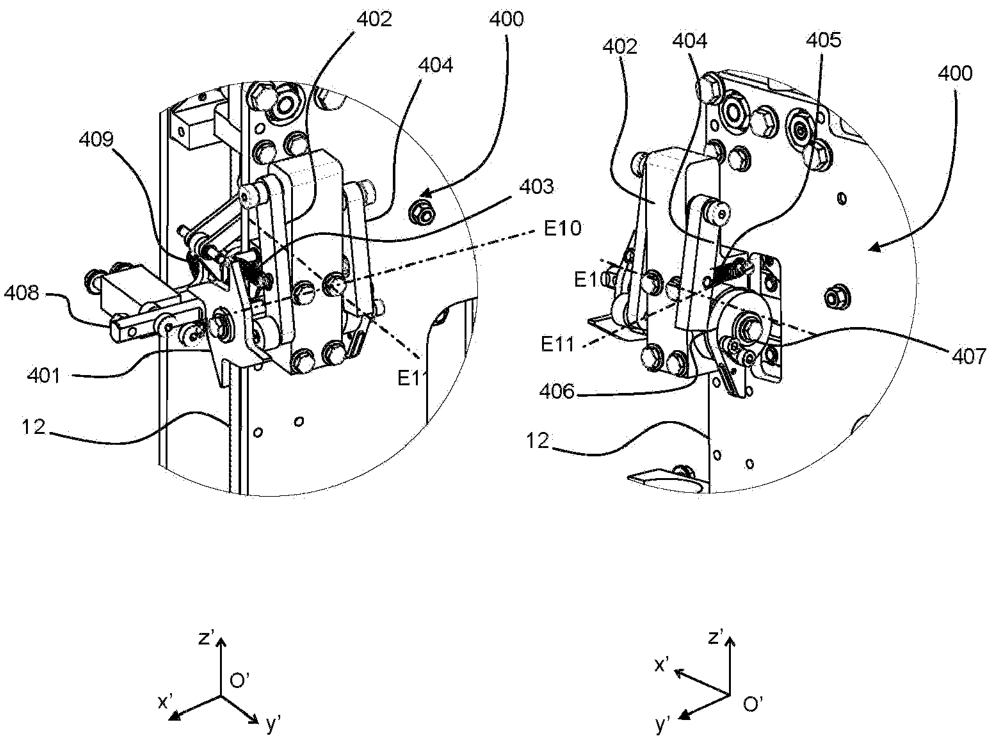

[Fig 27]
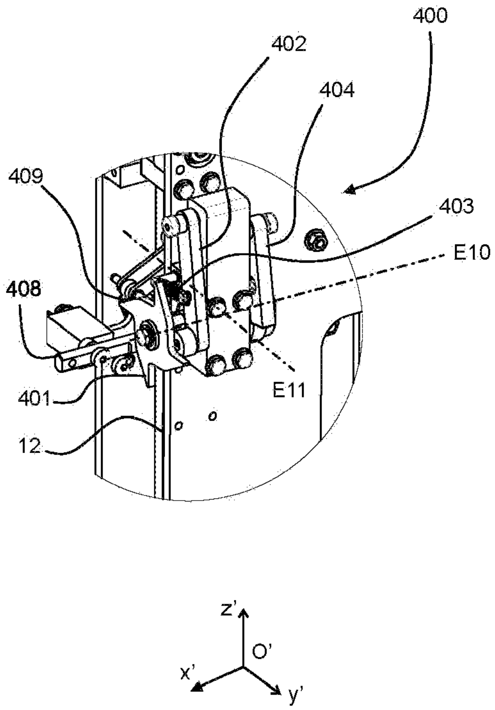
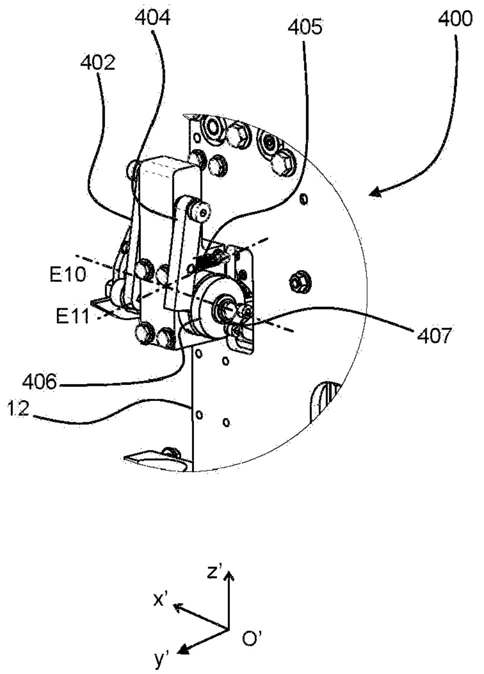

[Fig 28]
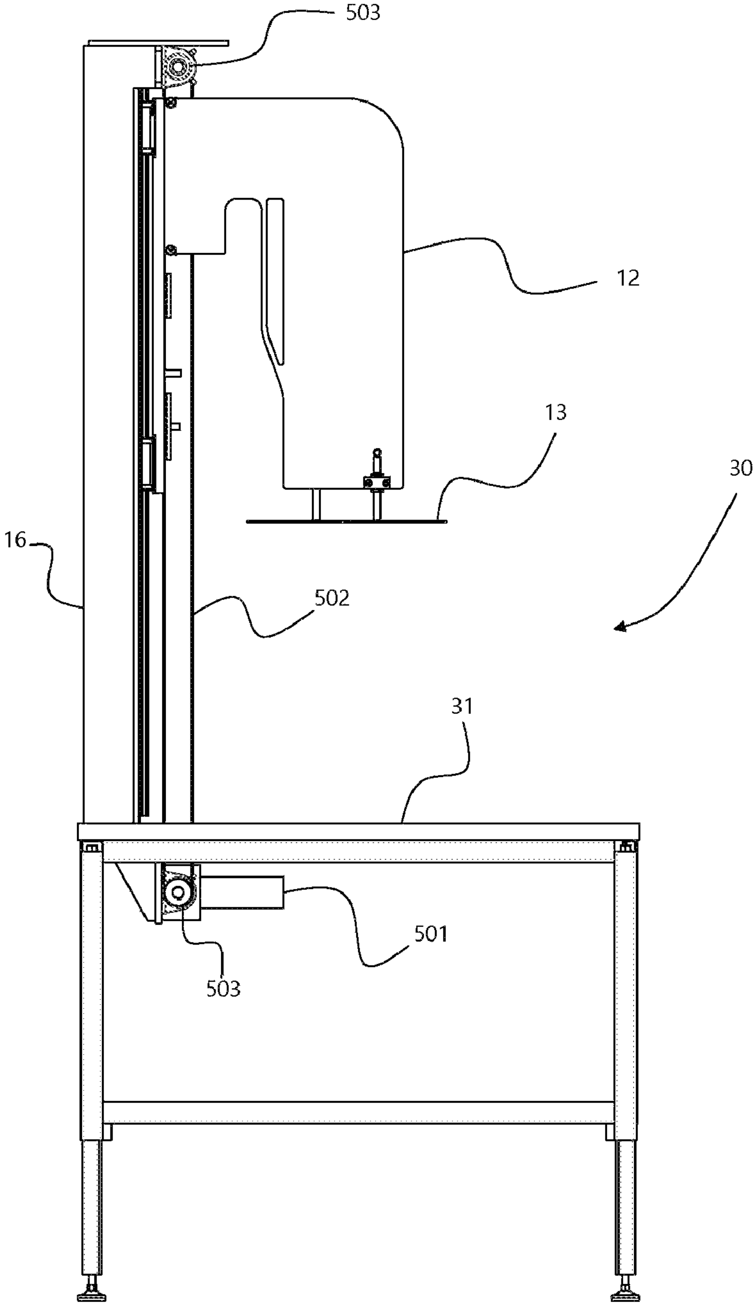

[Fig 29]
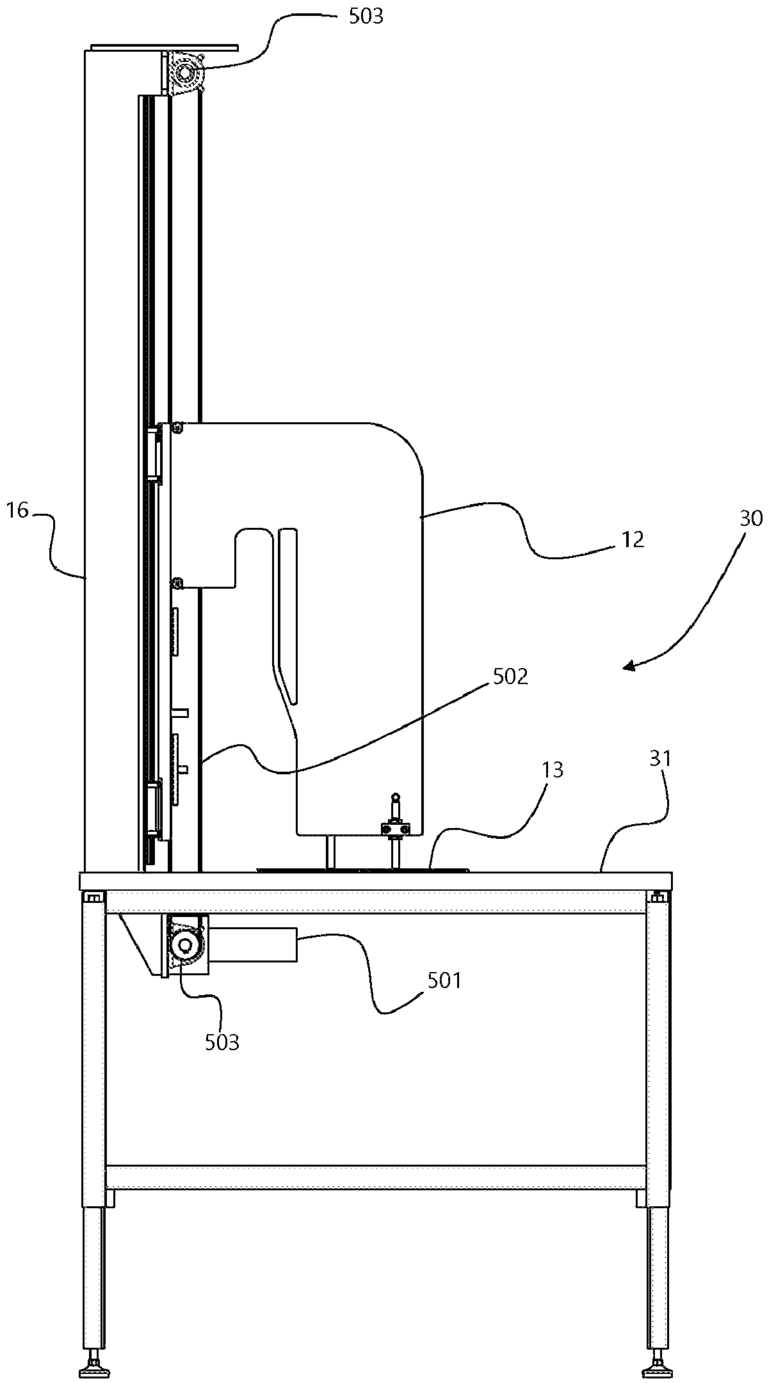

[Fig 30]
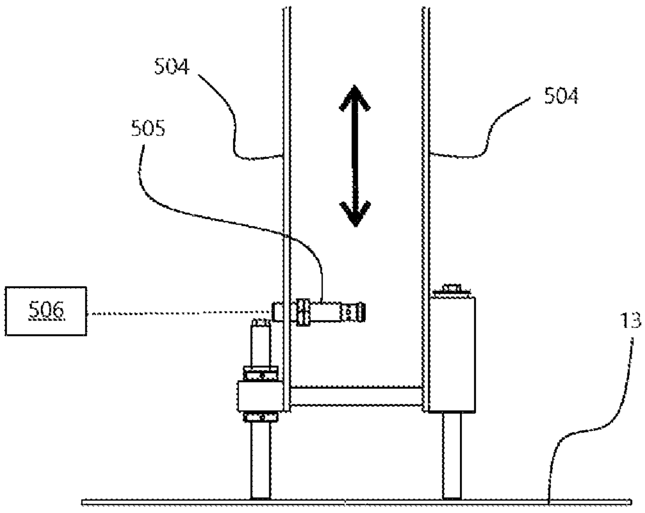

[Fig 31]
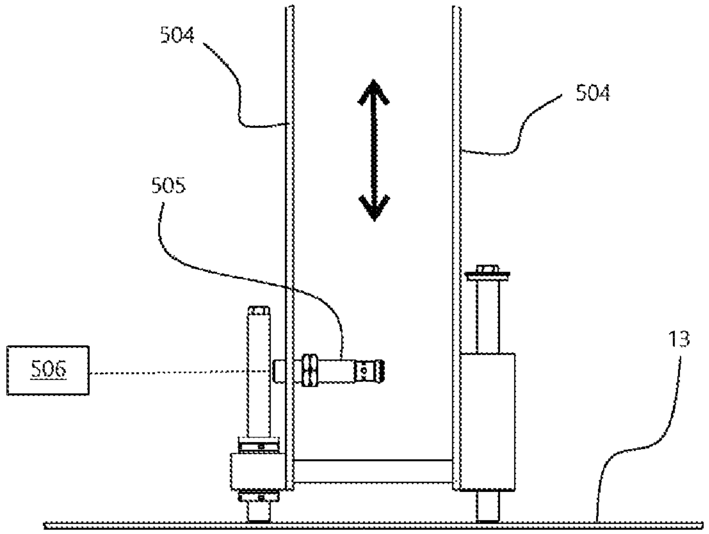

[Fig 32]
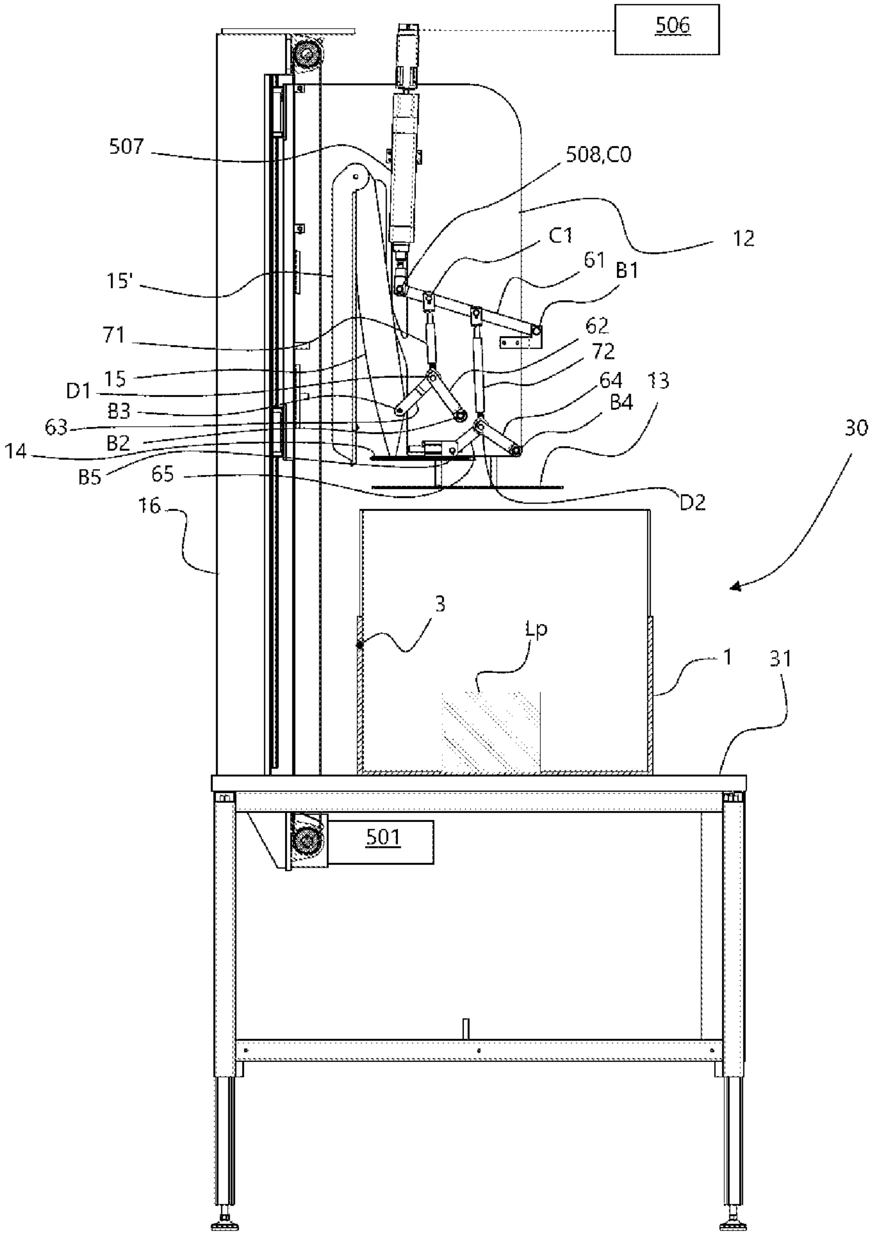

[Fig 33]
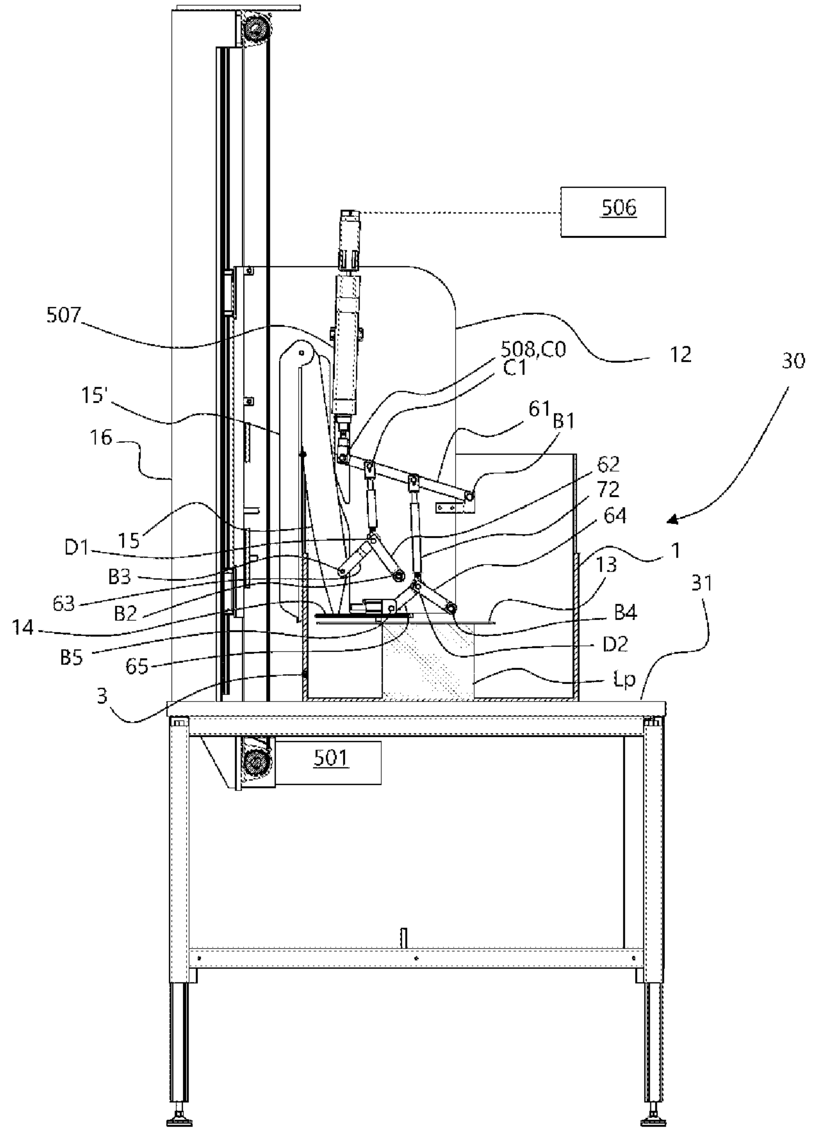

[Fig 34]
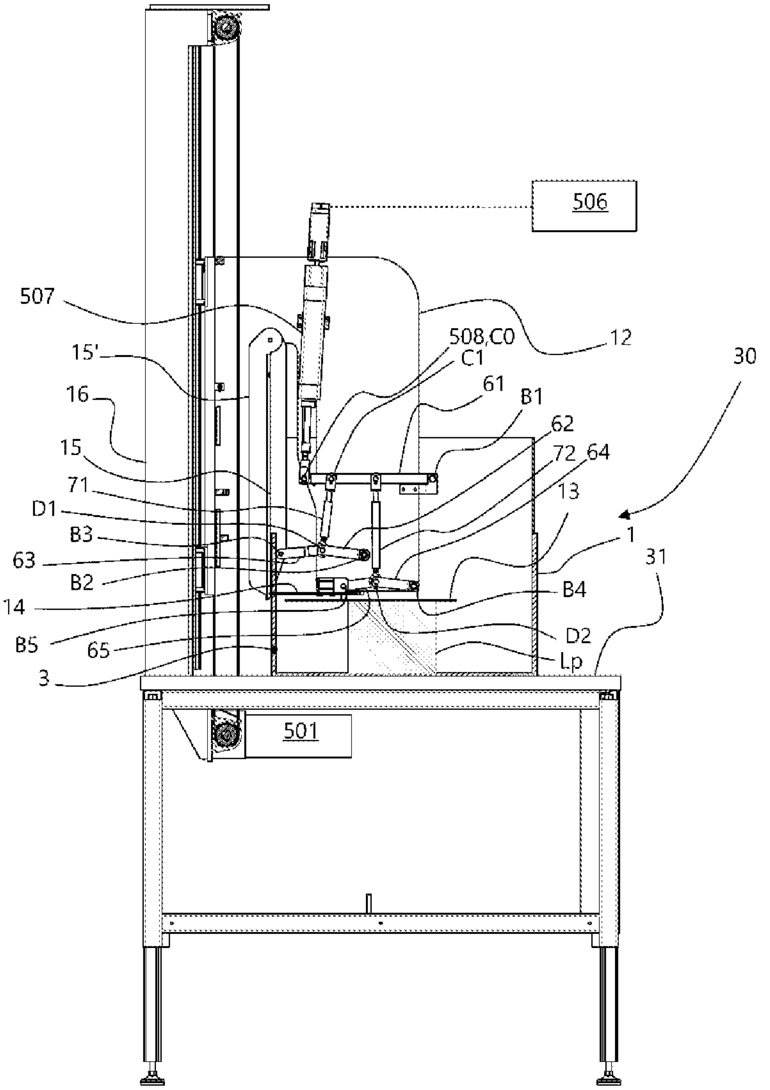

[Fig 35]
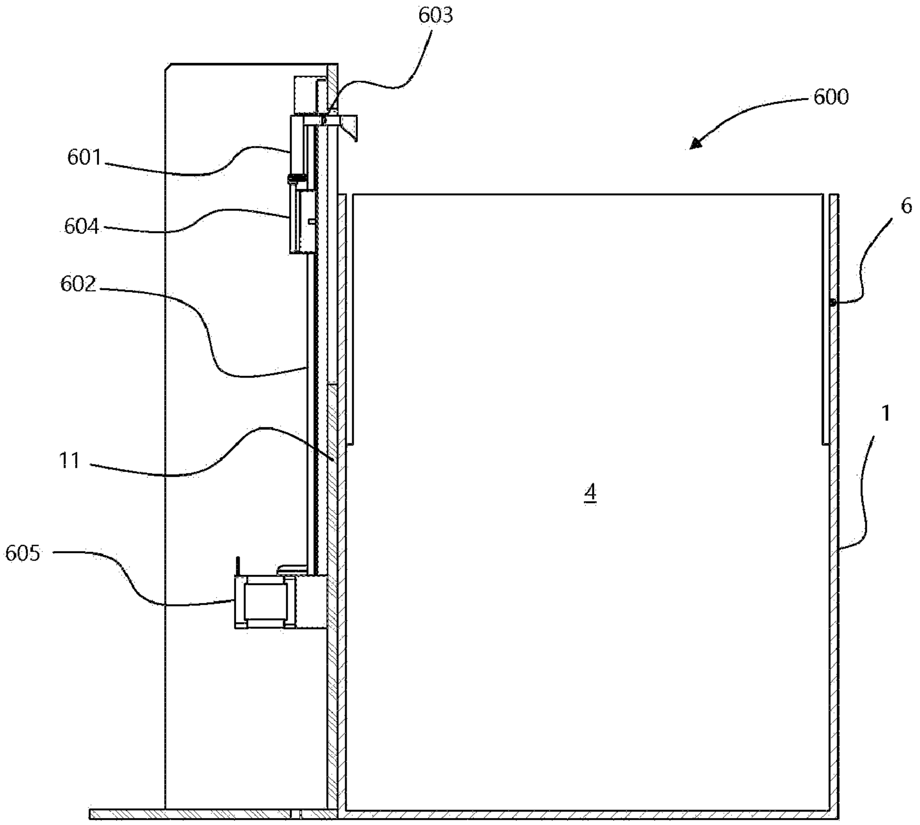

[Fig 36]
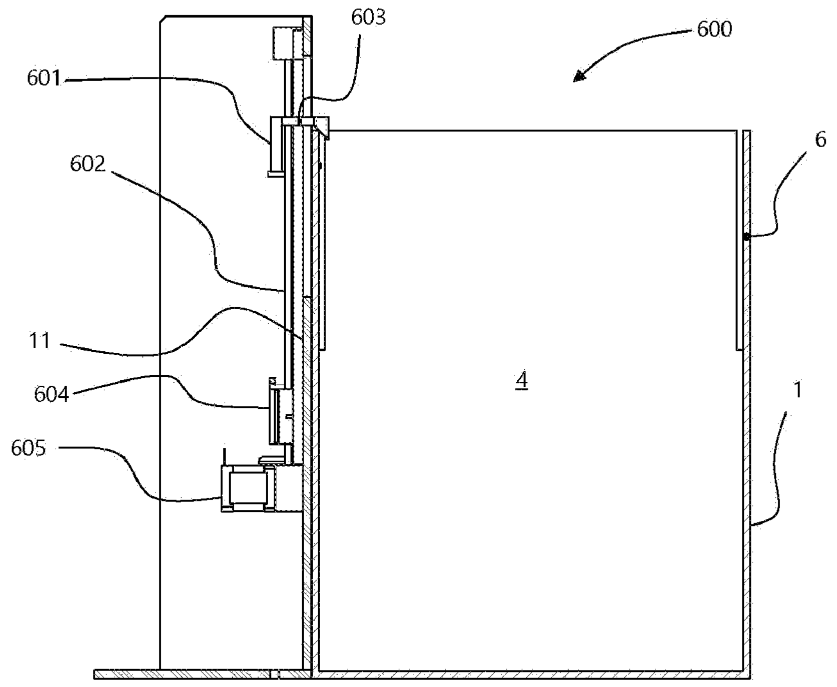

METHOD FOR REDUCING AN INITIAL HEIGHT OF A PACKAGE, SUCH AS A SLOTTED CONTAINER, ACCORDING TO ITS CONTENTS, AND DEVICE FOR CARRYING OUT SUCH A METHOD

The field of the present invention is that of methods for reducing an initial height of a package, such as a slotted container or the like, depending on its contents. It relates to such a method. It also relates to a device for implementing such a method.

In the field of order preparation, in other words distribution, it is common to have to ship an order comprising a plurality of objects of different shapes and sizes. To do this, it is common to use a package, such as a slotted container or the like, comprising a bottom bordered by four flanks joined two by two by an edge and each provided with a flap to accommodate the objects of the order therein, then to fold the flaps over the objects and finally to secure the flaps with an adhesive tape. The package includes a basic format, corresponding to a width and a length of the bottom, and an initial height, which define an overall volume for receiving the package.

Since each order is unique, the overall volume for receiving the package is rarely adapted to the volume of the objects in the order, such that the objects in the order are likely to be moved inside the package and deteriorate during transport, so that the recipient of the order has the unpleasant impression that the package is unsuitable for the order, in particular by being too bulky, and does not respect the precepts of an environmentally friendly activity. An effective solution to address this problem consists in reducing the initial height of the package to a final height to adapt it to a maximum height of the highest of the objects in the order. This is a method used by everyone at home and carried out by hand, and which is also the subject of automatic machines for companies that ship several hundred, even thousands, of orders per day.

An automatic method is thus known, which consists in measuring a maximum height of a batch of objects contained in the package using a mechanical feeler having dimensions which are substantially equal to the bottom of the package, then in simultaneously marking horizontally the four flanks of the package just above the feeler, then in tearing at the same time the four edges of the package from the level of the feeler and up to the top of the package, then in folding the four flaps thus formed thanks to the markings and cuts, and finally in keeping them closed by hot-melt bonding. This method has the drawback of requiring a different machine for each basic format of the package, and in particular each dimension and shape of the bottom of the package, and of generating expensive machines which are not financially justified for productions of less than a thousand packages per day.

Another automatic method is known which consists in measuring the maximum height of the batch of objects contained in the package using a non-contact sensor, then in marking horizontally, in the same movement, the four flanks of the package at the measurement level, then in cutting at the same time the four edges of the package from an altitude of the highest point detected by the non-contact sensor and up to the top of the package, then in folding the four flaps formed thanks to the markings and cuts, and finally in keeping them closed using an adhesive tape. This method has the drawback of inaccurately measuring the maximum height of the contents, and of generating the expensive and bulky machines which are also not financially justified for the productions of less than a thousand packages per day. For example, reference may be made to document WO 2016/151310 which describes a method and a device of the aforementioned type.

Moreover, document JP 2013/216055 proposes a device for reducing an initial height of a package comprising four knives for simultaneously cutting the four edges of the package. This device proves to be bulky, heavy, cumbersome and expensive to produce.

Moreover, document JP 2020/110978 proposes a device for reducing an initial height of a package including a lifting plate for bringing a flank of a package to a desired height, the flank circulating against a plate having a horizontal upper edge. The user manually cuts an edge of the package using a knife that comes substantially into contact with the horizontal upper edge. Then the user manually pushes the side outwards, such that the latter tends to fold along the horizontal edge of the plate. Such folding is irregular, often difficult, or even impossible, to achieve depending on the nature of the material forming the package. These arrangements result in a package whose cutting and folding are regularly of poor quality.

An object of the present invention is to propose a method and a device for reducing an initial height of a package that is simple, effective, and quick to implement, this method being either completely mechanical and carried out entirely by an operator, or at least partially automated, this method allowing using the same package for multitudes of batches of objects of different shapes and dimensions without having to make any adjustment to said device capable of implementing said method, this device being able to eliminate, in a simple embodiment, electronic and automatic components and elements, in order nevertheless to optimize an adaptation of the package to the batches of objects that the package contains, and to comply with the precepts of an environmentally friendly order preparation activity, minimizing a feeling of waste of material, while optimizing a securing of a transport and a distribution of the batches of objects.

Another object of the present invention is to propose a method allowing processing several distinct basic formats of packages without having to make adjustments to the device capable of implementing this method, in other words the present invention aims at proposing the same method and the same device which are operational for multiple packages whose respective bottoms and respective initial heights are distinct from each other, in shape and dimensions.

Another object of the present invention is to propose a simpler, less bulky device, and optimizing the use of the elements that compose it, and consequently much less expensive than an automatic machine of the prior art comprising a large number of sensors and electronic components subject to frequent breakdowns.

Another object of the present invention is to propose a method comprising simple successive phases comprising a limited number of movements to be performed by an operator on the device capable of implementing said method.

A primary object of the present invention is to propose a method for reducing an initial height of a package and a device capable of implementing such a method which is the best compromise for obtaining a final package whose cuts and folds are regular and cleanly made from a simple and space-saving device whose elements are used several times to minimize the costs of producing the device which are desired to be as low as possible.

The present invention falls within this context and proposes a method for reducing an initial height of a package, such as a slotted container or the like, including a bottom bordered by four flanks, an edge bordering two flanks and constituting a respective corner of the package, the package accommodating at least one batch of objects, and preferably a plurality of batches of objects, in particular four batches of objects distributed in each of the four corners of the package.

It is noted that the method of the present invention is advantageously implemented regardless of the number of batches of objects contained in the package, this number being able to exceed four, that is to say the number of corners of the package, the batches of objects being distributed on the bottom of the package, and in particular at least on the four corners of the package.

It is understood that a batch of objects is indifferently constituted of a single object or else of a plurality of objects stacked on top of each other or side by side.

In its generality, and as will be described below, the method of the present invention has a cycle that comprises four phases assigned to each of the corners of the package, including a priority phase comprising a step of determining, by the operator, a priority volume accommodating the batch of objects of maximum height and secondary volumes to determine a cutting height and a marking height which are assigned to all corners of the package regardless of the actual height of the batch of objects contained inside the secondary volumes. According to a completely mechanical approach of the present invention, each phase comprises only two movements exerted by the operator on a gripping member constituting the device, including a vertical downward thrust of the gripping member to move an arm of the device carrying a cutting tool and a marking tool towards the package, and a horizontal thrust to simultaneously actuate the tool for cutting an edge and the tool for marking the flanks. Then, the device returns to the initial position using counterweights to relieve the operator's effort. According to a partially automated approach of the present invention, these movements are exerted by means of at least one motor member, such as an electric motor. Thus, the package sees each of the corners thereof marked and cut at the same cutting height and the same marking height, which correspond to those determined for the batch of objects of maximum height, these cutting heights and marking heights also being assigned to the secondary volumes accommodating batches of secondary objects of height which is less than the maximum height. A package whose final height is adapted to maintaining the batch of objects of maximum height, while satisfactorily accommodating the other batches of objects is thus obtained, such final packaging having regular, clean, properly made cuts and markings to obtain a quality final packaging.

According to the present invention, the method comprises the following successive phases:

- a priority phase including the following steps:
  - a priority step of determining, by an operator, a priority volume and three secondary volumes, the priority volume housing a priority batch of objects of a maximum height, the priority volume being bordered by a priority edge and two flanks, each secondary volume being bordered by a secondary edge and two flanks. It is understood that this determination is for example carried out by a visual examination carried out by the operator inside the package.
  - a priority step of wedging the two flanks bordering the priority volume against a fixed stop, the priority wedging step being carried out prior to the priority moving step,
  - a priority step of moving, by a priority distance, an arm carrying a feeler inside the package to a final position in which the feeler returns in contact with the priority batch of objects in order to determine a priority height which is in accordance with the maximum height of the priority batch of objects,
  - a priority step of deforming the two flanks along two priority folding lines by means of a marking tool carried by the arm, the two priority folding lines bordering the priority volume being positioned at a marking height which is in accordance with the priority height,
  - a priority step of separating by means of a cutting tool carried by the arm of the two flanks which border the priority volume up to a cutting height which is in accordance with the priority height,
  - a priority step of returning the arm to the initial position,
- three secondary phases including the following steps:
  - a secondary step of wedging two flanks bordering the secondary volume against the fixed stop,
  - a secondary step of moving the arm by the priority distance to the final position,
  - a secondary step of deforming two flanks bordering the secondary volume along two secondary folding lines at the marking height by means of the marking tool,
  - a secondary step of separating the two flanks bordering the secondary volume up to the cutting height by means of the cutting tool,
  - a secondary step of returning the arm to the initial position.

The method advantageously comprises at least any one of the following features taken alone or in combination:

- the priority phase comprises a priority step of positioning, at the priority height, a variable stop on an arm support carrying the arm, the priority positioning step being carried out between the priority moving step and the priority deformation step,
- the priority moving step and the priority positioning step at the priority height of the variable stop are carried out successively from the same first priority movement performed by the operator. Such a first priority movement is for example a vertical downward thrust.
- the priority step of deforming the two flanks and the priority step of separating the two flanks are carried out from the same second priority movement, performed by the operator or else performed by means of a cylinder. In the case of the fully mechanical approach of the present invention, such a second priority movement is for example a horizontal thrust. In the case of the partially automated approach of the present invention, such a second priority movement is assisted by the cylinder.
- the secondary step of moving the arm by the priority distance is carried out from a first secondary movement identical to the first priority movement,
- the secondary step of deforming the two flanks and the secondary step of separating the two flanks are carried out from the same second secondary movement identical to the second priority movement,
- the method comprises at least one intermediate phase of rotating the package by 90° about an axis perpendicular to the bottom. More particularly, the rotation phase is carried out between the priority phase and a first secondary phase, as well as between two consecutive secondary phases. It is understood that a direction of rotation of the package is unimportant, nor even the fact of starting with a rotation of 90° or 180°, provided that the three secondary volumes are processed.

- the method comprises at least one final phase of removing the variable stop from the priority height,
- the priority step of positioning the variable stop at the priority height is a step of prohibiting a positioning of the arm at a height lower than the priority height, The present invention also relates to a device for implementing such a method, the device comprising a frame including a tray for receiving the package which is provided with a fixed stop, the frame being equipped with an arm support on which the arm is mounted movable in translation, the arm support being equipped with the variable stop which is capable of stopping a movement of the arm in the final position in which the marking tool is capable of producing the folding line at the marking height and in which the cutting tool is capable of cutting the edge up to the cutting height.

The device advantageously comprises at least one of the following features taken alone or in combination:

- the device comprises a carriage movable in translation on a carriage rail, the carriage being clamped on a carriage belt which drives a first return shaft which drives an arm belt on which the arm is clamped,
- the device comprises a movement transmission member which extends between a gripping member and the arm, the movement transmission member comprising a cable and a sheath accommodating the cable, the cable extending between a first connection point of the cable formed on a carriage support carrying the carriage and a second connection point of the cable formed on the arm, the sheath extending between a first anchoring point of the sheath formed on the gripping member and a second anchoring point of the sheath formed on the first lever which is mounted movable in rotation on the arm,
- the device comprises a motor member for setting the arm in motion,
- the device comprises a cylinder in relation to the first lever,
- the device comprises means for controlling the jack in relation to a sensor equipping the feeler to actuate the jack,
- a first rod and a second rod are mounted movable in rotation on the first lever to actuate the cutting tool and the marking tool respectively,
- the device comprises a means for locking/unlocking the marking tool and the cutting tool which is movable between a locking position in which the locking/unlocking means enables the deformation steps and the cutting steps and an unlocking position in which the locking/unlocking means prohibits the deformation steps and the cutting steps,
- the device comprises a cycle sequencer which is capable of counting the phases, indifferently priority and secondary phases, performed by the operator.
- The device comprises means for holding the flaps of the package against the fixed stop.

Other features and advantages of the invention will become apparent from the following description, on the one hand, and from several examples of embodiment given for information purposes and without limitation with reference to the appended schematic drawings, on the other hand, in which:

FIG. 1 is a schematic perspective illustration of a package with an initial height intended to be reduced from an implementation of a method of the present invention shown in FIG. 4.

FIG. 2 is a schematic perspective illustration of the package, shown in FIG. 1, two flanks of which have been removed to make visible volumes for receiving batches of objects of respective distinct heights which are disposed on a bottom of the package.

FIG. 3 is a schematic perspective illustration of the package, shown in FIGS. 1 and 2, two flanks of which have been removed to make visible a priority volume of a batch of objects visually identified by an operator and secondary volumes of other batches of objects.

FIG. 4 is a schematic illustration of the method for reducing the initial height of the package illustrated in FIG. 1.

FIG. 5 is a schematic perspective illustration of the package, shown in FIGS. 1 to 3, two flanks of which have been removed to make visible priority folding lines made on the package from the implementation of the method illustrated in FIG. 4.

FIG. 6 is a schematic perspective illustration of the package shown in FIGS. 1, 2, 3 and 5, which illustrates folding lines made on the package from the implementation of the method illustrated in FIG. 4.

FIG. 7 is a schematic perspective illustration of the package shown in FIGS. 1, 2, 3, 5 and 6, which illustrates edges of the package cut up to the folding lines from the implementation of the method illustrated in FIG. 4.

FIG. 8 is a schematic side illustration of a device according to a totally mechanical approach for implementing the method shown in FIG. 4, the device being illustrated in the initial position of a carriage and an arm constituting the device.

FIG. 9 is a schematic side illustration of the device for implementing the method shown in FIG. 4, the device being illustrated in the intermediate position of the carriage and the arm.

FIG. 10 is a schematic side illustration of the device for implementing the method shown in FIG. 4, the device being illustrated in the final position of the carriage and the arm.

FIG. 11 is a schematic front illustration of the device shown in FIGS. 8 to 10, the device being illustrated in the initial position of the carriage and the arm.

FIG. 12 is a schematic side view illustrating the carriage shown in FIGS. 8 to 11.

FIG. 13 is a schematic side view illustrating the arm equipped with a cutting tool in the initial position as that shown in FIG. 8.

FIG. 14 is a schematic side view illustrating the arm equipped with the cutting tool in the final position such as that shown in FIG. 9.

FIG. 15 is a schematic side view illustrating the arm equipped with a marking tool in the initial position as that shown in FIG. 8.

FIG. 16 is a schematic side view illustrating the arm equipped with the marking tool in the final position as that shown in FIG. 9.

FIG. 17 is a schematic side view illustrating the arm shown in FIGS. 13 to 16 which is equipped with a variable stop.

FIG. 18 is a schematic side view illustrating the variable stop shown in FIG. 17 in an initial position of the variable stop.

FIG. 19 is a schematic side view illustrating the variable stop shown in FIG. 17 in a final position of the variable stop.

FIG. 20 is a schematic perspective view of the arm illustrated in FIGS. 13 to 17 which is equipped with a means for locking/unlocking the marking tool and the cutting tool illustrated in the locking position.

FIG. 21 is a schematic perspective view of the arm illustrated in FIGS. 13 to 17 which is equipped with the means for locking/unlocking the marking tool and the cutting tool shown in FIG. 20 illustrated in the unlocking position.

FIG. 22 is a schematic sectional view of the locking/unlocking means illustrated in the locking position of the marking tool and the cutting tool as shown in FIG. 20.

FIG. 23 is a schematic sectional view of the locking/unlocking means illustrated in the unlocking position of the marking tool and the cutting tool as shown in FIG. 21.

FIG. 24 is a schematic perspective view of the arm, illustrated in FIGS. 13 to 18 and 21, which is equipped with a cycle sequencer shown in a first position.

FIG. 25 is a schematic perspective view of the arm, illustrated in FIGS. 13 to 18, 21 and 24, which is equipped with the cycle sequencer shown in a second position.

FIG. 26 is a schematic perspective view of the arm illustrated in FIGS. 13 to 18, 21, 24 and 25, which is equipped with the cycle sequencer shown in a third position.

FIG. 27 is a schematic perspective view of the arm illustrated in FIGS. 13 to 18, 21, 24 to 26, which is equipped with the cycle sequencer shown in a fourth position.

FIG. 28 is a schematic side illustration of a device according to an automated approach for implementing the method shown in FIG. 4, the device being illustrated in the initial position of a carriage and an arm constituting the device.

FIG. 29 is a schematic side illustration of the device for implementing the method shown in FIG. 4, the device being illustrated in the final position of the carriage and the arm.

FIG. 30 is a schematic illustration of a feeler constituting the device illustrated in FIGS. 28 and 29, the feeler being shown in an initial position.

FIG. 31 is a schematic illustration of the feeler illustrated in FIG. 30 shown in a final position.

FIG. 32 is a schematic side illustration of the device illustrated in FIGS. 28 and 29, the arm being positioned in the initial position.

FIG. 33 is a schematic side illustration of the device illustrated in FIGS. 28 and 29, the arm being positioned in the intermediate position.

FIG. 34 is a schematic side illustration of the device illustrated in FIGS. 28 and 29, the arm being positioned in the final position.

FIG. 35 is a schematic illustration of means for holding flaps of the package which are constituting the device illustrated in FIGS. 28 and 29 and which are shown in the initial position.

FIG. 36 is a schematic illustration of holding means illustrated in FIG. 35 and which are shown in the final position.

In FIG. 1, a package 1 is illustrated, such as a slotted container or the like, of the Fefco 0201 type or equivalent, for example made of solid or corrugated cardboard or the like. The package 1 is represented in an orthonormal reference frame Oxyz, whose axis Oz is a vertical axis and whose plane Oxy is a horizontal plane. The package 1 includes a bottom 2 which extends in a bottom plane P1 parallel to the plane Oxy bordered by four flanks 3. The flanks 3 extend in respective planes which are orthogonal to the bottom plane P1, such that the package 1 delimits an interior volume 4, preferably a parallelepiped volume. Two successive flanks 3 are separated by an edge 5*a*, 5*b*, 5*c*, 5*d* which extends in an edge direction D which is orthogonal to the bottom plane P1. The edges 5*a*, 5*b*, 5*c*, 5*d* are therefore four in number and comprise a first edge 5*a*, a second edge 5*b*, a third edge 5*c* and a fourth edge 5*d* which are parallel to each other and parallel to the edge direction D. Each flank 3 is provided with a flap 6 which overhangs the flank 3 to which it is assigned and which is connected to this flank 3 by means of a folding line 7 perpendicular to the edge direction D. The package 1 has an initial height Hi taken between the bottom 2 and the folding line 7 in a direction parallel to the edge direction D.

It is noted at this stage of the description that the method of the invention also applies to a package without a flap, such as a Fefco 0200 type box or the like, such a package then being associated with a lid which encloses the flanks to cover the interior volume.

In FIG. 2, each edge 5*a*, 5*b*, 5*c*, 5*d* and the two flanks 3 which border said edge 5*a*, 5*b*, 5*c*, 5*d* jointly delimit a corner of the package 1 which comprises a volume V1, V2, V3, V4 for receiving a respective batch of objects L1, L2, L3, L4 disposed on the bottom 2 of the package 1, as illustrated in FIG. 2. Thus, the interior volume 4 comprises at least one first volume V1 for receiving a first batch of objects L1, a second volume V2 for receiving a second batch of objects L2, a third volume V3 for receiving a third batch of objects L3 and a fourth volume V4 for receiving a fourth batch of objects L4, the four batches of objects L1, L2, L3, L4 possibly being the same object in the simple case of a package 1 containing only one type of object. It is also understood that the package is likely to accommodate more than four batches of objects L1, L2, L3, L4 distributed on the bottom 2 of the package 1. It is also noted that the package 1 is likely to accommodate a single batch of objects without deviating from the rules of the present invention, as explained below.

It is understood that each receiving volume V1, V2, V3, V4 is likely to have a surface S1, S2, S3, S4 taken parallel to the bottom plane P1 which is distinct from the other surfaces. It is also noted that the batches of objects L1, L2, L3, L4 are likely to be of any shape and size, and in particular larger than those shown in FIG. 2.

Each batch of objects L1, L2, L3, L4 extends between a lower face Fi1, Fi2, Fi3, Fi4 which rests on the bottom 2 of the package 1 and an upper face Fs1, Fs2, Fs3, Fs4 opposite the lower face Fi1, Fi2, Fi3, Fi4 in a direction parallel to the edge direction D. Each batch of objects L1, L2, L3, L4 is likely to have a distinct height H1, H2, H3, H4, the height H1, H2, H3, H4 being measured in a direction which is parallel to the edge direction D between the lower face Fi1, Fi2, Fi3, Fi4 and the upper face Fs1, Fs2, Fs3, Fs4 of the corresponding batch of objects L1, L2, L3, L4. Thus, a first batch of objects L1 has a first height H1, taken between a first lower face Fi1 of the first batch of objects L1 and a first upper face Fs1 of the first batch of objects L1; a second batch of objects L2 has a second height H2, taken between a second lower face Fi2 of the second batch of objects L2 and a second upper face Fs2 of the second batch of objects L2; a third batch of objects L3 has a third height H3, taken between a third lower face Fi3 of the third batch of objects L3 and a third upper face Fs3 of the third batch of objects L3 and a fourth batch of objects L4 has a fourth height H4, taken between a fourth lower face Fi4 of the fourth batch of objects L4 and a fourth upper face Fs4 of the fourth batch of objects L4. The four heights H1, H2, H3, H4, are likely to be distinct from each other. Among these four heights H1, H2, H3, H4, there is a maximum height Hmax which is the greatest of these four heights H1, H2, H3, H4. In the illustrated example and the rest of the description, it is considered that the highest batch of objects is the first batch of objects L1.

Referring to FIG. 3, it is considered that the one of the receiving volumes V1, V2, V3, V4 comprising the batch of objects with maximum height Hmax is a priority volume Vp and that the other receiving volumes V1, V2, V3, V4 are secondary volumes Vs1, Vs2, Vs3. Thus, the priority volume Vp accommodates a priority batch of objects Lp which has the maximum height Hmax and the secondary volumes Vs1, Vs2, Vs3 accommodate secondary batches of objects Ls1, Ls2, Ls3 which have respective secondary heights Hs1, Hs2, Hs3 which are less than or equal to the maximum height Hmax. In the illustrated example and the rest of the description, the priority volume Vp is the first volume V1 and the secondary volumes Vs1, Vs2, Vs3 are the second volume V2, the third volume V3 and the fourth volume V4. Thus, the priority volume Vp is bordered by a priority edge 50, consisting of the first edge 5*a* in the illustrated example, while the secondary volumes Vs1, Vs2, Vs3 are bordered by secondary edges 51, 52, 53. In other words, a first secondary volume Vs1 is bordered by a first secondary edge 51, a second secondary volume Vs2 is bordered by a second secondary edge 52 illustrated in dotted lines in FIG. 3, and a third secondary volume Vs3 is bordered by a third secondary edge 53.

In FIG. 4, a method 100 for reducing the initial package height Hi is schematically represented. The method 100 comprises at least four successive phases 200, 201, 202, 203 carried out by an operator which concern respectively each of the four receiving volumes V1, V2, V3, V4. More particularly, a priority phase 200 concerns the priority volume Vp, a first secondary phase 201 concerns the first secondary volume Vs1, a second secondary phase 202 concerns the second secondary volume Vs2 and a third secondary phase 203 concerns the third secondary volume Vs3.

The method 100 preferably includes at least one initial phase 300 of extracting the flaps 6 of the package 1 from the interior volume 4 of the package 1 delimited by the bottom 2 and the four flanks 3.

The priority phase 200 includes the following steps:

- a priority step 200*a* of determining by the operator by visual examination of the priority volume Vp accommodating the priority batch of objects Lp including the maximum height Hmax of the batches of objects L1, L2, L3, L4, the priority volume Vp being bordered by a priority edge 50 and two flanks 3,
- a priority step 200*b* of wedging the two flanks 3 bordering the priority volume Vp against walls 11*a* of a fixed stop 11, preferably arranged in a V-shape with an angle of 90°, which has the effect of positioning the priority batch of objects Lp directly above an arm 12 equipped with a feeler 13, a marking tool 14 and a cutting tool 15, the arm 12 being movable in translation along an arm support 16 which is arranged in a rail and which extends along a support axis A1, parallel to the edge direction D,
- a priority step 200*c* for moving the arm 12 along the support axis A1 which causes a movement of the feeler 13 inside the interior volume 4 by a priority distance Zp from an initial position of the feeler 13, illustrated in FIG. 8, in which the feeler 13 is disposed at a distance from the priority batch of objects Lp to a final position of the feeler 13, illustrated in FIG. 10, in which the feeler 13 comes into contact with the upper surface Fs1 of the priority batch of objects Lp disposed in the priority volume Vp, by passing through an intermediate position of the feeler 13 illustrated in FIG. 9. It is noted at this stage of the description that, in order to facilitate an understanding of the method 100, FIGS. 8, 9 and 10 are shown without a batch of objects such that the priority distance Zp illustrated in FIG. 8 is the maximum priority distance Zp obtained in the absence of a batch of objects.
- a priority step 200*d* of positioning a variable stop 17 on the arm support 16 at a priority height Hp which is in accordance with the maximum height Hmax of the priority batch of objects Lp. It is understood that the stop is variable in that a position of the stop is variable along the arm support 16.
- a priority step 200*e* of deforming the flanks 3 bordering the priority volume Vp by means of the marking tool 14, the marking tool 14 being movable between a rest position in which the marking tool 14 is located at a distance from the flanks 3 and a working position in which the marking tool 14 exerts a pressure against two portions of the flanks 3 bordering the priority volume Vp along two priority folding lines 20 which intersect the priority edge 50 and which are disposed at a marking height Hm, shown in FIG. 5, which is in accordance with the priority height Hp. It is noted that the fixed stop 11 forms an obstacle against the marking tool 14 between which the portions of the flanks 3 are interposed to be marked in their thickness,
- a priority step 200*f* of separating the two flanks 3 bordering the priority volume Vp by means of the cutting tool 15, the cutting tool 15 circulating through the priority edge 50 from a priority starting point 30*a* which comprises the folding line 7 of the package 1 to a priority arrival point 30*b* located at a cutting distance Hd, shown in FIG. 5, from the priority starting point 30*a* which is in accordance with the priority height Hp,
- a step 200*g* of returning the arm 12 to the initial position Zi.

Then, the method 100 comprises a first intermediate phase 301 of rotation of the package 1 by 90° about an axis perpendicular to the bottom 2.

Then, the method 100 comprises a first secondary phase 201 which includes the following steps:

- a first secondary step 201*b* of wedging the two flanks 3 bordering the first secondary volume Vs1 against the walls 11*a* of the fixed stop 11 and of positioning the first secondary batch of objects Ls1 directly above said arm 12,
- a first secondary step 201*c* of moving the arm 12 along the arm support 16 to the variable stop 17,
- a first secondary step 201*e* of deforming the two flanks 3 bordering the first secondary volume Vs1 by means of the marking tool 14, so that the marking tool 14 exerts a pressure against two portions of the flanks 3 bordering the first secondary volume Vs1 along two first secondary folding lines 21 which intersect a first secondary edge 51 bordering the first secondary volume Vs1 and which are disposed at the marking height Hm. It is noted that the same fixed stop 11 still forms an obstacle against the marking tool 14 between which the portions of the flanks 3 are interposed to be marked in their thickness,
- a first secondary step 201*f* of separating the two flanks 3 bordering the first secondary edge 51 by means of the cutting tool 15, the cutting tool 15 circulating through the first secondary edge 51 from a first secondary starting point 21*a* which comprises the folding line 7 of the package 1 to a first secondary arrival point 21*b* located at the cutting distance Hd from the first secondary starting point 21*a*, a first secondary step 201*g* of returning the arm 12 to the initial position Zi.

Then, the method 100 comprises a second intermediate phase 302 of rotation of the package 1 by 90° about an axis perpendicular to the bottom 2.

Then, the method 100 comprises a second secondary phase 202 which includes the following steps:

a second secondary step 202*b* of wedging the two flanks 3 bordering the second secondary volume Vs2 against the walls 11*a* of the fixed stop 11 and of positioning the second secondary batch of objects Ls2 directly above said arm 12, a second secondary step 202*c* of moving the arm 12 along the arm support 16 to the variable stop 17, a second secondary step 202*e* of deforming the two flanks 3 bordering the second secondary volume Vs2 by means of the marking tool 14, so that the marking tool 14 exerts a pressure against two portions of the flanks 3 bordering the second secondary volume Vs2 along two second secondary folding lines 22 which intersect a second secondary edge 52 bordering the second secondary volume Vs2 and which are disposed at the marking height Hm. It is noted again that the same fixed stop 11 still forms an obstacle against the marking tool 14 between which the portions of the flanks 3 are interposed to be marked in their thickness, a second secondary step 202*f* of separating the two flanks 3 bordering the second secondary edge 52 by means of the cutting tool 15, the cutting tool 15 circulating through the second secondary edge 52 from a second secondary starting point 32*a* which comprises the folding line 7 of the package 1 to a second secondary arrival point 32*b* located at the cutting distance Hd from the second secondary starting point 32*a,* a second secondary step 202*g* of returning the arm to the initial position.

Then, the method 100 comprises a third intermediate phase 303 of rotation of the package 1 by 90° about an axis perpendicular to the bottom 2.

Then, the method 100 comprises a third secondary phase 203 which includes the following steps:

a third secondary step 203*b* of wedging the two flanks 3 bordering the third secondary volume Vs3 against the walls 11*a* of the fixed stop 11 and of positioning the third secondary batch of objects Ls3 directly above said arm 12, a third secondary step 203*c* of moving the arm 12 along the arm support 16 to the variable stop 17, a third secondary step 203*e* of deforming the two flanks 3 bordering the third secondary volume Vs3 by means of the marking tool 14, so that the marking tool 14 exerts pressure against two portions of the flanks 3 bordering the third secondary volume Vs3 along two third secondary folding lines 23 which intersect a third secondary edge 53 bordering the third secondary volume Vs3 and which are disposed at the marking height Hm. It is also noted that the same fixed stop 11 still forms an obstacle against the marking tool 14 between which the portions of the flanks 3 are interposed to be marked in their thickness, a third secondary step 203*f* of separating the two flanks 3 bordering the third secondary edge 53 by means of the cutting tool 15, the cutting tool 15 circulating through the third secondary edge 53 from a third secondary starting point 33*a* which comprises the folding line 7 of the package 1 to a third secondary arrival point 33*b* located at the cutting distance Hd from the third secondary starting point 33*a,* a third secondary step 203*g* of returning the arm 12 to the initial position Zi.

Then, the method 100 comprises a final phase 310 of removal of the variable stop 17 from the priority height Hp.

It is noted that the method 100 of the present invention advantageously proposes to reuse the same elements of the device 10 at each phase 200, 201, 202, 203, and in particular the fixed stop 11, the marking tool 14 and the cutting tool 15 which are unique in the device 10 and which participate in each phase 200, 201, 202, 203 of the method 100 to minimize a weight and a size requirement of the device 10, while reducing the manufacturing and maintenance costs of the device 10, and allowing an easy movement of the device 10.

This method 100 is implemented by the device 10 illustrated in FIGS. 8 to 11 in its fully mechanical approach and in FIGS. 28 to 34 in its partially automated approach, and represented within an orthonormal reference frame O'x'y'z'. The device 10 will be described first in its manual approach, then in its partially automated approach, the references being the same in both approaches for what is common to them.

The device 10 comprises a frame 30 which includes a plate 31 formed in a plate plane P2 which is parallel to the plane O'x'y'. The plate 31 is intended to receive the bottom 2 of the package 1. The fixed stop 11 is directly mounted on the plate 31. The fixed stop 11 is in particular arranged in a V-shape and the walls 11*a* form an angle of 90° therebetween to accommodate two flanks 3 of the package 1 against them. The fixed stop 11 preferably includes a groove 11*b* formed between the walls 11*a* to form a passage for the cutting tool 15 when separating the flanks 3 bordering the edges Sa, 5*b*, 5*c*, 5*d*. The fixed stop 11 constitutes a member for wedging the flanks 3 of the package 1 to position it under the feeler 13 and also constitutes an obstacle against the marking tool 14 to enclose the flanks 3 of the package 1 so that the latter are marked in their thickness and thus form the folding lines 20, 21, 22, 23.

The frame 30 is equipped with a carriage 32 which is movable in translation along a carriage rail 33 extending along a rail axis A2 parallel to the vertical axis O'z'. To this end, the carriage 32 is provided with a gripping member 34 provided with a gripping handle 35 that can be grasped by an operator. More particularly, when the operator exerts a vertical thrust P downwards, substantially parallel to the axis O'z', the carriage 32 circulates along the carriage rail 33 downwards, between an initial position illustrated in FIG. 8, and a final position illustrated in FIG. 10, passing through an intermediate position illustrated in FIG. 9.

The carriage rail 33 is carried by a carriage support 36 which is provided with a plurality of carriage pulleys 37 on which a carriage belt 38 circulates. The carriage pulleys 37 are comprised in a plane parallel to the plane O'y'z'. The carriage 32 being gripped on the carriage belt 38 by means of a carriage flange 39, it is understood that the vertical thrust P exerted by the operator causes a translation of the carriage 32, parallel to the rail axis A2 and along the latter, which in turn causes a circulation of the carriage belt 38 along the carriage pulleys 37.

The carriage belt 38 is also mounted on a first return pulley 41 which is axially provided with a first return shaft 42, which extends along an axis parallel to the axis O'x'. The first return shaft 42 is also axially provided with a second return pulley 43 which is mounted on an arm belt 44. The arm belt 44 also circulates on at least one arm pulley 43' within a plane parallel to the plane O'y'z'. The arm 12 being gripped on the arm belt 44 by means of an arm flange 45, it is understood that the vertical thrust P exerted by the operator downwards also causes a rotation on itself of the first return shaft 42, which induces a circulation of the arm belt 44 on the second return pulley 43 and the arm pulley 43', which causes a translation of the arm 12 gripped on the arm belt 44 downwards along the support axis A1. This translation occurs until the feeler 13 comes into contact with the upper surface Fs1 of the priority batch of objects Lp disposed in the priority volume Vp, which the operator has taken care to dispose under the feeler 13, during the priority step 200*a* of determining, by visual examination by the operator, the priority volume Vp accommodating the priority batch of objects Lp including the maximum height Hmax of the batches of objects L1, L2, L3, L4.

It is noted that the arm 12 is connected to an arm counterweight 12*a* by means of an arm rope 12*b* which is able to circulate along counterweight pulleys 12*c*. The arm counterweight 12*a* is capable of moving inside a sheath 12*d* under the effect of its own weight or conversely under the effect of the vertical thrust P between the initial position illustrated in FIG. 8 and the final position illustrated in FIG. 10. More particularly, the arm counterweight 12*a* tends to return the arm 12 to the initial position to an operator's work, at the end of the priority phase 200 and the secondary phases 201, 202, 203.

Referring also to FIGS. 12 to 16, a movement transmission member 46 extends between the gripping member 34 and the arm 12. The movement transmission member 46 comprises a cable 47 and a sheath 48 accommodating the cable 47. More particularly, the cable 47 extends between a first connection point 47*a* of the cable 47 formed on the carriage support 36 and a second connection point 47*b* of the cable 47 arranged on the arm 12. The sheath 48, in turn, extends between a first anchoring point 48*a* of the sheath 48 formed on the gripping member 34 and a second anchoring point 48*b* of the sheath 48 formed on a first lever 61. The first lever 61 is mounted movable in rotation on the arm 12 about a first lever axis B1, which is parallel to the axis O'y', as illustrated in FIGS. 13 to 16, while the gripping member 34 is mounted movable in rotation on the carriage support 36 about a gripping axis B'.

These arrangements are such that when the operator exerts a horizontal thrust P' on the gripping member 34, the first lever 61 tilts about the first lever axis B1, so as to bring the second connection point 47*b* and the second anchoring point 48*b* closer together. Such an approximation causes a movement of a first rod 71 which is mounted movable in rotation on the first lever 61 about a first rod axis C1, which is parallel to the axis O'y'.

The first rod 71 is provided with a second lever 62 and a third lever 63 which are both mounted movable in rotation on the first rod 71 about a first tilting axis D1. The second lever 62 is mounted movable in rotation on the arm 12 about a second lever axis B2, which is parallel to the axis O'y'. The third lever 63 is mounted movable in rotation on the cutting tool 15 about a third lever axis B3, which is parallel to the axis O'y'. These arrangements are such that when the operator exerts the horizontal thrust P', the first rod 71 separates the second lever 62 and the third lever 63 from each other, such that the cutting tool 15 joins a fixed knife 15' secured to the arm 12 in order to separate any one of the edges Sa, 5*b*, 5*c*, 5*d*, 50, 51, 52, 53 bordering two flanks 3 of the package 1.

Referring to FIGS. 15 and 16, it can be seen that, simultaneously with what has just been described, when the operator exerts a horizontal thrust P' on the gripping member 34, the first lever 61 tilts about the axis of the first lever B1, such as to bring the second connection point 47*b* and the second connection point 48*b* closer together. Such an approximation causes a movement of a second rod 72 which is mounted movable in rotation on the first lever 61 about a second rod axis C2, which is parallel to the axis Oy.

The second rod 72 is provided with a fourth lever 64 and a fifth lever 65 which are both mounted movable in rotation on the second rod 72 about a second tilting axis D2. The fourth lever 64 is mounted movable in rotation on the arm 12 about a fourth lever axis B4, which is parallel to the axis O'y'. The fifth lever 65 includes a fifth lever end 65' which abuts against a plate 65" which is secured to the marking tool 14 and which is preferably arranged in a square. These arrangements are such that when the operator exerts the horizontal thrust P', the second rod 72 separates the fourth lever 64 and the fifth lever 65 from each other, such that the marking tool 14 deforms the two flanks 3 along any one of the folding lines 20, 21, 22, 23.

In FIG. 17, the variable stop 17 is mounted on the arm 12 and is movable in translation along the arm support 16. The variable stop 17 comprises a first variable stop arm 18 which carries the feeler 13 and which is mounted movable in rotation on a second variable stop arm 19 about a first arm axis E0. The second variable stop arm 19 extends between a first end of the second arm 19*a* and a second end of the second arm 19*b* while being movable in rotation on the arm 12 about a second arm axis E1. The first arm axis E0 is interposed between the second arm axis E1 and the first end of the second arm 19*a*.

Referring also to FIGS. 18 and 19, the variable stop 17 comprises a slide 171 movable in translation on the arm support 16. The slide 171 is provided with a first left leg 172*a* and a first right leg 172*b* which are each mounted movable in rotation on the slide 171 about a respective slide axis E2, parallel to the axis O'y'. Each first leg 172*a*, 172*b* is equipped with a respective second leg 173*a*, 173*b*. A second left leg 173*a* is mounted movable in rotation on the first left leg 172*a* about a left leg axis E3 parallel to the slide axis E2. A second right leg 173*b* is mounted movable in rotation on the first right leg 172*b* about a right leg axis E4 parallel to the slide axis E2. Each second leg 173*a*, 173*b* is mounted movable in rotation on a rear plate 174 and a front plate (not shown for reasons of clarity) about a respective plate axis E5, E6. It is understood that the front plate is substantially identical to the rear plate 174, the rear plate 174 and the front plate being disposed on either side of the arm support 16. Each second leg 173*a*, 173*b* carries a stop element 175*a*, 175*b* which is movable in rotation about the corresponding plate axis E5, E6. Thus, a left stop element 175*a* is mounted movable in rotation on a left plate axis E5 and a right stop element 175*b* is mounted movable in rotation on a right plate axis E6. Each stop element 175*a*, 175*b* includes a respective stop end 176*a*, 176*b* which comes into contact with the arm support 16 by forming a hard point when a vertical support A is exerted by the second end of the second arm 19*b* on the slide 171 as illustrated in FIG. 19. It is noted that the presence of rollers 176 which facilitate a sliding of the variable stop 17 along the arm support 16.

It is understood that when the feeler 13 comes into contact with the upper surface Fs1 of the priority batch of objects Lp disposed in the priority volume Vp, the first variable stop arm 18 causes the second variable stop arm 19 to rotate about the axis of the second arm E1, the second end of the second arm 19*b* of which presses on the slide 171 so that the stop ends 176*a*, 176*b* bear against the arm support 16 and prevent the arm 12 from continuing its travel along the arm support 16. It is also understood that this action is carried out during the priority step 200*d* of positioning, at the priority height Hp, the variable stop 17 on the arm support 16 carrying the arm 12. The variable stop is thus positioned at the priority height Hp and remains stationary during the subsequent steps of the method 100. It is also noted that this positioning of the variable stop 17 determines the subsequent secondary steps 201*c*, 202*c*, 203*c* of moving the arm 12 by the priority distance Zp, as well as the secondary steps 201*e*, 202*e*, 203*e* of deforming the two flanks 3 bordering the secondary volumes Vs1, Vs2, Vs3 along the two secondary folding lines 21, 22, 23 by means of the marking tool 14 as well as the secondary steps 201*f*, 202*f*, 203*f* of separating the two flanks 3 bordering the secondary volumes Vs1, Vs2, Vs3 by means of the cutting tool 15, as will be described below.

It is also noted that an additional leg 177 is mounted movable in rotation on the first right leg 172*b* and on the second right leg 173*b* about the right leg axis E4. The additional leg 177 connects the first right leg 172*b* and the second right leg 173*b* to a needle 178 which comprises a needle leg 178*a* which is fixedly mounted on the rear plate 174 or the front plate or an axis connecting the rear plate and the front plate. The needle leg 178*a* extends along a needle axis E8 and carries a needle end 178*b* which is mounted to be movable in translation along the needle leg 178*a*.

It is understood that during the descent of the slide 171, the additional leg 177 pushes the needle end 178*b* upwards along the needle axis E8 such that the needle end 178*b* is located higher after the vertical support A on the slide 171 than before such support.

The needle end 178*b* is provided to come into contact against the second variable stop arm 19 in order to allow the secondary deformation steps 201*e*, 202*e*, 203*e* and the secondary separation steps 201*f*, 202*f*, 203*f* when the arm 12 encounters the variable stop 17 immobilized during the priority positioning step 200*d*.

Referring again to FIG. 17, there is the presence of two return members 17*a*, 17*b*, including a first return member 17*a* which connects the left leg axis E3 to the rear plate 174 or else the front plate or an axis connecting the rear plate 174 and the front plate, and including a second return member 17*b* which connects the right leg axis E4 to the rear plate 174 or the front plate or an axis connecting the rear plate 174 and the front plate. These arrangements aim at returning the second legs 173*a*, 173*b* to a fixed position which promotes the maintenance in contact of the stop ends 176*a*, 176*b* against the arm support 16 when the slide 171 is in the low position after application of the force A. Conversely, before the application of the vertical support A, these arrangements aim at returning the second legs 173*a*, 173*b* to a fixed position which promotes a spacing between the stop ends 176*a*, 176*b* and the arm support 16 when the slide 171 is in the high position.

It is also noted that the variable stop 17 is equipped with a variable stop counterweight 171*a* which is connected to the variable stop 17 by means of a variable stop rope 171*b* capable of circulating on a variable stop pulley 171*c*. More particularly, the variable stop wire 171*b* is anchored on the rear plate 174 or the front plate or an axis connecting the rear plate 174 and the front plate. These arrangements aim at bringing the variable stop 17 upwards.

In FIGS. 20 and 21, the device 10 is equipped with means 80 for locking/unlocking the marking tool 14 and the cutting tool 15 which is shown in the locking position in FIG. 20 and in the unlocking position in FIG. 21. It is understood that in the locking position, the locking/unlocking means 80 prohibits the priority step 200*e* of deforming the flanks 3 along two priority folding lines 20 bordering the priority volume Vp by means of the marking tool 14 carried by the arm 12, and the priority step 200*f* of separating the two flanks 3 bordering the priority volume Vp by means of the cutting tool 15 carried by the arm 12, as well as the secondary steps 201*e*, 202*e*, 203*e* of deforming two flanks 3 bordering the secondary volume Vs1, Vs2, Vs3 along two secondary folding lines 21, 22, 23 by means of the marking tool 14, and the secondary steps 201*f*, 202*f*, 203*f* of separating the two flanks 3 bordering the secondary volume Vs1, Vs2, Vs3 by means of the cutting tool 15. It is also understood that in the unlocking position, the locking/unlocking means 80 enables the priority step 200*e* of deforming the flanks 3 along two priority folding lines 20 bordering the priority volume Vp by means of the marking tool 14 carried by the arm 12, and the priority step 200*f* of separating the two flanks 3 bordering the priority volume Vp by means of the cutting tool 15 carried by the arm 12, as well as the secondary steps 201*e*, 202*e*, 203*e* of deforming two flanks 3 bordering the secondary volume Vs1, Vs2, Vs3 along two secondary folding lines 21, 22, 23 by means of the marking tool 14, and the secondary steps 201*f*, 202*f*, 203*f* of separating the two flanks 3 bordering the secondary volume Vs1, Vs2, Vs3, by means of the cutting tool 15.

This objective is achieved from the locking/unlocking means 80 which establishes a mechanical connection between the second variable stop arm 19 and the first lever 61 to keep the first lever 61 stationary in the locking position illustrated in FIG. 20, regardless of an action by the operator, and which makes the second variable stop arm 19 and the first lever 61 in the unlocking position free of mechanical connection to allow a maneuver of the first lever 61 from an action by the operator on the first lever 61 as illustrated in FIG. 21. It is understood that in the locking position, it is not possible for the operator to set the first lever 61 in motion. On the other hand, a contact of the feeler 13 on a batch of objects L1, L2, L3, L4, Lp, Ls1, Ls2, Ls3 sets the first variable stop arm 18 in motion, which causes the second variable stop arm 19 to tilt from the locking position to the unlocking position, which allows the operator to set the first lever 61 in motion by applying a horizontal thrust P' to the grip handle 35. On the other hand again, a contact of the end of the needle 178*b* with the second variable stop arm 19 also causes the second variable stop arm 19 to tilt from the locking position to the unlocking position, which allows the operator to set the first lever 61 in motion by applying the horizontal thrust P' to the grip handle 35.

In FIGS. 22 and 23, the locking/unlocking means 80 comprises the first end of the second arm 19*a* which is movable inside a lumen 81 included in a bracket 82 between a locking position illustrated in FIG. 22 and an unlocking position illustrated in FIG. 23. In the locking position, the first end of the second arm 19*a* presses on a barrel 83 by means of a roller 84 interposed between the first end of the second arm 19*a* and the barrel 83. The barrel 83 circulates inside a channel 83' parallel to the axis O'y'. The barrel 83 includes a first barrel end 83*a* carrying the caster 84 and a second barrel end 83*b* which is equipped with a barrel arm 85 mounted movable in rotation on the second barrel end 83*b* and on a tilting member 86. The tilting member 86 is mounted movable in rotation on the bracket 82 between the locking position in which a tilting element 87 that the tilting member 86 includes is accommodated inside a window 90 and the unlocking position in which the tilting element 87 is placed outside the window 90. The tilting member 86 also includes a tilting end 88 which is provided with a return element 89 interposed between the tilting end 88 and the bracket 82. The return element 89 is intended to return the tilting member 86 to the locking position in order to allow the second variable stop arm 19 to return to the locking position when the second variable stop arm 19 is no longer in contact with the feeler 13 or the slide end 178*b*.

The window 90 is delimited by a frame 91 which is constituting a connecting member 92 which is arranged in a rod extending along an axis parallel to the axis O'z' and which includes a rod element 93 circulating inside a sleeve 94 arranged along an axis parallel to the axis O'z'. The connecting member 92 also includes a strut 95 which is also mounted movable in rotation on the first lever 61.

It is understood that when the first end of the second arm 19*a* is aligned with the barrel 83, the tilting element 87 is held inside the window 90 by the impossibility of tilting the tilting member 86, the first lever 61 is then held stationary as well as the marking tool 14 and the cutting tool 15, regardless of an action of the operator.

It is also understood that when the first end of the second arm 19*a* is misaligned with the barrel 83, the tilting element 87 can be placed outside the window 90, allowing the tilting member 86 to pivot, the first lever 61 can then set the marking tool 14 and the cutting tool 15 in motion, if the operator applies a horizontal thrust P' on the gripping handle 35.

In FIGS. 24 to 27, the device 10 is equipped with a cycle sequencer 400 which is secured to the arm 12. The cycle sequencer 400 comprises a sequencing shaft 401 which is mounted movable in rotation on the arm 12 along a first sequencing axis E10 parallel to the axis O'x'. A first indexing arm 402 is mounted movable in rotation on the arm 12 along an axis parallel to the axis O'x'. The first indexing arm 402 is held in contact with the sequencing shaft 401 using a tension spring 403 which is mounted movable in rotation on the arm 12, on the one hand, and mounted movable in rotation on the first indexing arm 402, on the other hand. A second indexing arm 404 is mounted movable in rotation on the arm 12 along an axis parallel to the axis O'x'. The second indexing arm 4 is held in contact with the sequencing shaft 2 using a first tension spring 405 which is mounted movable in rotation on the arm 12, on the one hand, and mounted movable in rotation on the second indexing arm 404, on the other hand. A deactivation finger 406 of the variable stop 17 is mounted freely rotating on the sequencing shaft 401 along the first sequencing axis E10. The deactivation finger 406 is held in a relative angular position relative to the sequencing shaft 401 by means of a torsion spring 407. A sequencing finger 408 is mounted freely rotating on the frame 30 along a second sequencing axis E11 parallel to the axis O'y'.

The sequencing finger 408 is held in a horizontal position using a tension spring 409 mounted movable in rotation on the frame 30, on the one hand, and mounted movable in rotation on the sequencing finger 408 on the other hand.

It is understood that during the descent of the arm 12 along the axis A1, the sequencing shaft 401 meets the sequencing finger 408 which is secured to the frame 30. A contact between the sequencing finger 408 and the sequencing shaft 401 causes a 90° rotation of the sequencing shaft 401. An indexing of the sequencing shaft 401 at 90° is promoted by the contact between the first indexing arm 402 and the sequencing shaft 401 thanks to a particular shape of the sequencing shaft 401. It is noted for this purpose that the sequencing shaft 401 is preferably arranged in a four-pointed star. The rotation of the sequencing shaft 2 causes at the same time the rotation of the deactivation finger 406 by 45°.

Thus, during the priority step 200*c* of moving the arm 12, the deactivation finger 406 which is initially positioned parallel to the plane O'x'y' is positioned parallel to the plane O'x'z'.

Then, during the first secondary step 201*c* of moving the arm 12, the deactivation finger 406 which is initially positioned parallel to the plane O'x'z' is positioned parallel to the plane O'x'y'.

Then, during the second secondary step 202*c* of moving the arm 12, the deactivation finger 406 which is initially positioned parallel to the plane O'x'y' is positioned parallel to the plane O'x'z'.

Then, during the third secondary step 203*c* of moving the arm 12, the deactivation finger 406 which is initially positioned parallel to the plane O'x'z' is positioned parallel to the plane O'x'y'. This has the effect that the deactivation finger 406 is retracted as it passes in front of the variable stop 17 thanks to the torsion spring 407.

Finally, during the third secondary step of returning the arm 12 in the initial position Zi to the position 203*g*, the deactivation finger 406 encounters the slide 171 of the variable stop 17. This has the effect of moving the slide 171 upwards, causing the deactivation of the variable stop 17 which rises with the arm 12 in the initial position Zi.

These arrangements are such that when the operator wishes to reduce the initial height Zi of a package 1, he positions the package on the plate 31 by imperatively placing the priority batch of objects Lp under the feeler 13 by wedging the flanks 3 bordering the priority volume Vp against the fixed stop 11.

Then, the operator actuates the gripping member 34 according to a vertical thrust P downwards to lower the carriage 32 downwards which induces a downward descent of the arm 12 inside the package 1. When the feeler 13 comes into contact with the upper face Fs1, Fs2, Fs3, Fs4 of the priority batch of objects Lp, this triggers the installation of the variable stop 17 on the arm support 16 and stops a descent of the arm 12 along the support 16. At this stage, the locking/unlocking means 80 is placed in the unlocking position such that when the operator exerts a horizontal thrust P' on the gripping member 34, this horizontal thrust P' pulls the cable 47, so as to actuate the marking member 14 and the cutting member 15 to respectively carry the priority folding lines 20 on said flanks 3 and cut the priority edge 50. This also causes an actuation of the cycle sequencer 400. Then the operator, assisted by the arm counterweight 12*a*, returns the arm 12 to the initial position.

Then, the operator positions the first secondary batch of objects Ls1 under the feeler 13 by wedging the flanks 3 bordering the first secondary volume Vs1 against the fixed stop 11.

Then, the operator actuates the gripping member 34 according to a vertical thrust P downwards to lower the carriage 32 downwards which induces a downward descent of the arm 12 inside the package 1. When the arm 12 encounters the variable stop 17, this stops the descent of the arm 12 along the support 16. At this stage, the locking/unlocking means 80 is placed in the unlocking position such that, when the operator exerts a horizontal thrust P' on the gripping member 34, this horizontal thrust P' pulls the cable 47, so as to actuate the marking member 14 and the cutting member 15 to respectively carry the first secondary folding lines 21 on said flanks 3 and cut the first secondary edge 51. This also causes an actuation of the cycle sequencer 400.

Then, the operator assisted by the arm counterweight 12*a* returns the arm 12 to the initial position.

Then, the operator positions the second secondary batch of objects Ls2 under the feeler 13 by wedging the flanks 3 bordering the second secondary volume Vs12 against the fixed stop 11.

Then, the operator actuates the gripping member 34 according to a vertical thrust P downwards to lower the carriage 32 downwards which induces a downward descent of the arm 12 inside the package 1. When the arm 12 encounters the variable stop 17, this stops the descent of the arm 12 along the arm support 16. At this stage, the locking/unlocking means 80 is placed in the unlocking position such that, when the operator exerts a horizontal thrust P' on the gripping member 34, this horizontal thrust P' pulls the cable 47, so as to actuate the marking member 14 and the cutting member 15 to respectively carry the first secondary folding lines 21 on said flanks 3 and cut the first secondary edge 51. This also causes an actuation of the cycle sequencer 400. Then, the operator assisted by the arm counterweight 12*a* returns the arm 12 to the initial position.

Then, the operator positions the third secondary batch of objects Ls3 under the feeler 13 by wedging the flanks 3 bordering the third secondary volume Vs3 against the fixed stop 11.

Then, the operator actuates the gripping member 34 according to a vertical thrust P downwards to lower the carriage 32 downwards which induces a downward descent of the arm 12 inside the package 1. When the arm 12 encounters the variable stop 17, this stops the descent of the arm 12 along the arm support 16. At this stage, the locking/unlocking means 80 is placed in the unlocking position such that, when the operator exerts a horizontal thrust P' on the gripping member 34, this horizontal thrust P' pulls the cable 47, so as to actuate the marking member 14 and the cutting member 15 to respectively carry the first secondary folding lines 21 on said flanks 3 and cut the first secondary edge 51. This also causes an actuation of the cycle sequencer 400. Then, the operator assisted by the arm counterweight 12*a* returns the arm 12 to the initial position.

This upward movement allows the deactivation finger 406 to disengage the variable stop 17 from the arm 12 which is returned to its initial position by following the movement of the arm 12 while being assisted by the variable stop counterweight 171*a*.

Then, the operator folds the flanks 3 along the folding lines 20, 21, 22, 23 to close the package 1.

In FIGS. 28 and 29, the device 10 is shown from the side according to an automated approach, the device 10 being illustrated in the initial position of the arm 12 in FIG. 28 and in the final position of the arm 12 in FIG. 29. The device 10 comprises a motor member 501, such as an electric motor or the like, which is capable of circulating a motor belt 502 along two motor pulleys 503, for example by rotating one of the motor pulleys 503. The arm 12 is clamped on the motor belt 502, such that the arm 12 is driven in translation on the arm support 16 when the motor belt 502 circulates around the motor pulleys 503. These arrangements aim at allowing the priority moving step 200*c* and the secondary moving steps 201*c*, 202*c*, 203*c*.

Thus, the arm 12 moves in vertical translation thanks to linear guide, for example produced by ball skates on two parallel rails secured to the arm support 16. As in the manual approach, the arm 12 houses the feeler 13, the cutting tool 15, the fixed knife 15' and the marking tool 14. As soon as the feeler 13 comes into contact with the priority batch of objects Lp, the feeler 13 moves in vertical translation on guide rails 504 between the initial position illustrated in FIG. 30 and the final position illustrated in FIG. 31. Such a movement is detected by a sensor 505, such as an optical sensor or the like, for example secured to the guide rails 504, which is in relation with control means 506, which store the priority height Hp.

In FIGS. 32 to 34, the device 10 comprises a cylinder 507, such as an electric cylinder, which is secured to the arm 12 and which comprises a rod which is movable in translation. The rod which is movable in translation includes a movable end 508 which is mounted movable in rotation on a first lever 61 about a cylinder axis C0. The first lever 61 is mounted movable in rotation on the arm 12 about a first lever axis B1. These arrangements are such that, during the priority phase 200, when the sensor 13 comes into contact with the priority batch of objects Lp, the control means 506 actuate the cylinder 507 whose movable end 508 is set in motion to push on the first lever 61 as illustrated successively in FIGS. 32 to 34. The first lever 61 tilts about the first lever axis B1 and such tilting causes a movement of a first rod 71 which is mounted movable in rotation on the first lever 61 about a first rod axis C1.

The first rod 71 is provided with a second lever 62 and a third lever 63 which are both mounted movable in rotation on the first rod 71 about a first tilting axis D1. The second lever 62 is mounted movable in rotation on the arm 12 about a second lever axis B2. The third lever 63 is mounted movable in rotation on the cutting tool 15 about a third lever axis B3. These arrangements are such that when the cylinder 507 pushes on the first lever 61, the first rod 71 separates the second lever 62 and the third lever 63 from each other, such that the cutting tool 15 joins a fixed knife 15' secured to the arm 12 in order to separate any one of the edges Sa, 5*b*, 5*c*, 5*d*, 50, 51, 52, 53 bordering two flanks 3 of the package 1.

It is observed that, simultaneously with what has just been described, when the cylinder 507 pushes on the first lever 61 and tilts about the first lever axis B1, such tilting causes a movement of a second rod 72 which is mounted movable in rotation on the first lever 61 about a second rod axis C2. The second rod 72 is provided with a fourth lever 64 and a fifth lever 65 which are both mounted movable in rotation on the second rod 72 about a second tilting axis D2. The fourth lever 64 is mounted movable in rotation on the arm 12 about a fourth lever axis B4. The fifth lever 65 is mounted movable in rotation on the marking tool 14 about a fifth lever axis B5. These arrangements are such that when the cylinder 507 pushes on the first lever 61, the second rod 72 separates the fourth lever 64 and the fifth lever 65 from each other, such that the marking tool 14 moves in horizontal translation and deforms the two flanks 3 along any one of the folding lines 20, 21, 22, 23.

It is noted that the cutting tool 15 and the marking tool 14 are actuated by the same cylinder 507 and that a toggle arrangement of the rods and levers allows increasing a cutting force beyond the force of the cylinder 507.

It is understood that during the priority phase 200, the cylinder is actuated when the sensor comes into contact with the priority batch Lp, and that during the subsequent secondary phases 201, 202, 203, the cylinder 507 is actuated by the control means 506 which have stored the priority height Hp to exert the same movement and the same displacement as during the priority phase 200.

It is also understood that the motor member 501 allows a descent of the arm 12 to the priority height Hp if the feeler 13 does not encounter any object, then the cylinder 507 actuates the cutting tool 15 and the marking tool 14, then the motor member 501 allows a rise of the arm 12. If the feeler 13 encounters an object, the sensor 505 informs the control means 506 of the height of the object. Then the motor member 501 continues to allow a descent of a parameterized value which allows obtaining an accurate distance between the upper face of the object and the marking tool 14, then the marking tool 14 and the cutting tool are actuated by the cylinder 507, then the motor member 501 returns the arm 12 to the initial position. The height of the object is stored in the control means for the subsequent phases. It is noted that if the feeler 13 touches an object before the priority height Hp is reached during the secondary phases, a fault is signaled.

In FIGS. 35 and 36, the device 10 comprises means 600 for holding the flaps 6 outside the interior volume 4. The holding means are intended to hold the flaps 6 in a vertical position against the fixed stop 11, such that the flaps 6 do not hinder the descent of the arm 12 inside the interior volume 4 of the package 1. Such holding means 600 are particularly useful when the package 1 is a used package.

The holding means 600 comprise an upper block 601 which is movable in translation on a vertical guide 602 formed at the rear of the fixed stop 11. The upper block 601 comprises a paver 603 which presses with its own weight on the top of the flap 6. The holding means 600 comprise a lower block 604 which circulates on the vertical guide below the upper block 601. The lower block 604 is in relation with an actuator 605 which is capable of circulating it along the vertical guide until lifting the upper block 601. When the actuator 605 lowers the lower block 604, the upper block also undergoes a downward movement until it comes into contact with the top of the flap 6 to finally hold the flap against the fixed stop.

In the rest position, the actuator 605 holds the lower block 603 and the upper block 601 in the high position so as to allow an installation of a package of the greatest height provided against the fixed stop 11. The holding means 600 comprise at least one sensor for detecting the presence of the package 1 against the fixed stop 11 to allow a descent of the lower block 604 and a placement of the upper block 601 against the top of the flap 6.

It is understood that the descent of the lower block 604 along the vertical guide 602 is possible when a presence of the package 1 against the fixed stop 11 is detected, when the two flaps 6 are pressed against the fixed stop 11 and when the operator starts the actuator 605.

The invention claimed is:

1. A method for reducing an initial height of a package, the package having a bottom bordered by four flanks and an edge bordering two flanks of the four flanks, the package accommodating at least one batch of objects, the method comprising:

a primary step having the following sequential steps:

determining a primary volume and three secondary volumes, the primary volume accommodating at least one batch of objects, the at least one batch of objects having a maximum height, the primary volume being bordered by a primary edge and two flanks, each secondary volume of the three secondary volumes being bordered by a secondary edge and another pair of flanks;

wedging the two flanks bordering the primary volume against a fixed stop;

moving an arm carrying a feeler inside the package to a final position in which the feeler returns to contact the at least one batch of objects in order to determine a priority height which is in accordance with the maximum height of the at least one batch of objects;

deforming the two flanks along a respective pair of folding lines with a marking tool, the marking tool being carried by the arm, the pair of folding lines bordering the primary volume being at a marking height, the marking height corresponding to the priority height;

separating the two flanks with a cutting tool carried by the arm to a cutting height, the cutting height corresponding to the priority height; and returning the arm to an initial position; and three secondary phases having the following sequential steps:

wedging the two flanks bordering the secondary volume against the fixed stop;

moving the arm by a distance to the final position;

deforming the two flanks bordering the secondary volume along a pair of secondary folding lines at the marking height by the marking tool;

separating the two flanks bordering the secondary volume up to the cutting height by the cutting tool; and returning the arm to the initial position.

2. The method of claim 1, wherein the primary step further comprising:

positioning a variable stop on an arm support that carries the arm, the step of positioning the variable stop occurring between the step of moving and the step of deforming.

3. The method of claim 2, wherein the step of positioning at the priority height of the variable stop comprises:

prohibiting a positioning of the arm at a height lower than the priority height.

4. The method of claim 1, wherein the step of moving and the step of positioning are carried out successively.

5. The method of claim 1, wherein the step of deforming step and the step of separating step of the primary step are carried out during the step of moving in the three secondary phases.

6. The method of claim 1, wherein the step of moving in the three secondary phases is carried out from a first secondary movement to a first primary movement.

7. The method of claim 1, wherein the step of deforming and the step of separating of the three secondary phases are carried out with a second secondary movement identical to a second primary movement.

8. The method of claim 1, further comprising:

rotating the package by 90° around an axis perpendicular to the bottom of the package.

9. The method of claim 1, further comprising:

removing the variable stop from the priority height.

10. A device for implementing the method of claim 1, the device comprising:

a frame having a tray that receives the package, the tray having the fixed stop;

an arm support positioned on said frame, the arm carried by said arm support, said arm being mounted so as to movable in translation;

the feeler carried by said arm;

the marking tool carried by said arm; and the cutting tool carried by said arm.

11. The device of claim 10, wherein said arm support has a variable stop that is adapted to stop the movement of said arm at the final position, said marking tool adapted to produce the folding line at the marking height at the final position, said cutting tool adapted to cut the edge of the package up to the cutting height.

12. The device of claim 10, further comprising:

a carriage movable in translation on a carriage rail, said carriage being clamped on a carriage belt that drives a first return shaft, the first return shaft driving an arm belt on which said arm is clamped.

13. The device of claim 10, further comprising:

a first lever movably mounted in rotation on said arm.

14. The device of claim 13, further comprising:

a movement transmission member that extends between a gripping member and said arm, said movement transmission member having a cable and a sheath, the sheath receiving the cable, the cable extending between a first connection point and a second connection point of the cable, the first connection point being formed on a carriage support, the carriage support carrying said carriage, the second connection point formed on said arm, the sheath extending between a first anchoring point and a second anchoring point, the first anchoring point being formed on the gripping member, the second anchoring point formed on said first lever.

15. The device of claim 14, further comprising:

a first rod and second rod movable mounted in rotation on said first lever in order to actuate said cutting tool and said marking tool.

16. The device of claim 14, further comprising:

a cylinder connected to said first lever.

17. The device of claim 16, further comprising:

a cylinder controller cooperative with said cylinder so as to control said cylinder in relation to a sensor on said feeler.

18. The device of claim 10, further comprising:

a locking device movable between a locking position and an unlocking position for said marking tool and said cutting tool, the locking position enabling a deforming and cutting of the two flanks, the unlocking position prohibiting the deforming and the cutting of the two flanks.

19. The device of claim 10, further comprising:

a cycle sequencer cooperative with said arm so as to count a phase of the device.

20. The device of claim 10, further comprising:

a motor member drivingly connected to said arm so as to move said arm.

21. The device of claim 10, further comprising:

a holder that holds the flaps of the package against the fixed stop.

* * * * *